US010951952B2

(12) United States Patent
Kiyooka

(10) Patent No.: US 10,951,952 B2
(45) Date of Patent: *Mar. 16, 2021

(54) VIDEO STREAMING PLAYBACK SYSTEM AND METHOD

(71) Applicant: Tetsuro Kiyooka, Vancouver (CA)

(72) Inventor: Tetsuro Kiyooka, Vancouver (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/894,391

(22) Filed: Jun. 5, 2020

(65) Prior Publication Data
US 2020/0351560 A1  Nov. 5, 2020

Related U.S. Application Data

(63) Continuation-in-part of application No. 16/643,310, filed as application No. PCT/JP2018/039899 on Oct. 26, 2018.

(Continued)

(30) Foreign Application Priority Data

Mar. 23, 2018  (WO) ................. PCT/JP2018/011619

(51) Int. Cl.
H04N 21/478 (2011.01)
H04N 21/4784 (2011.01)
(Continued)

(52) U.S. Cl.
CPC ..... H04N 21/4784 (2013.01); H04N 21/2743 (2013.01); H04N 21/812 (2013.01); H04N 21/8545 (2013.01)

(58) Field of Classification Search
CPC .......... H04N 21/2743; H04N 21/2407; H04N 21/25435; H04N 21/26603;
(Continued)

(56) References Cited

U.S. PATENT DOCUMENTS 7,020,637 B2   3/2006  Bratton
7,366,687 B2 * 4/2008  Yoshimine ............. G06Q 20/04
                                                    705/27.1
(Continued)

FOREIGN PATENT DOCUMENTS

EP    3672266 A2    6/2020
JP    2001-344530 A  12/2001
(Continued)

OTHER PUBLICATIONS

Fumitada Takahashi, "Cheap HD video machines develop a new form of broadcasting," Nikkei Electronics, Nov. 12, 2012, No. 1095, pp. 69-75, with partial English translation.
(Continued)

Primary Examiner — Chenea Davis
(74) Attorney, Agent, or Firm — Panitch Schwarze Belisario & Nadel LLP

(57) ABSTRACT

A video streaming playback system is provided with a video playback module, a tipping module, a reward download button/link display module, and a setup interface for selecting to offer a reward or not offer a reward for a video which a user who is a content creator has uploaded; wherein the reward download button/link display module is configured to, in response to a tip payment process being executed for the video, display an activated reward download button/link on the user interface when the user who is a content creator has selected using the setup interface to offer a reward upon payment of a tip, or has not selected using the setup interface to not offer a reward upon payment of a tip, and not display an activated reward download button/link on the user interface when the user who is a content creator has not selected using the setup interface to offer a reward upon payment of a tip, or has selected using the setup interface to not offer a reward upon payment of a tip.

11 Claims, 32 Drawing Sheets

Related U.S. Application Data

(60) Provisional application No. 62/577,924, filed on Oct. 27, 2017.

(51) Int. Cl.
*H04N 21/81* (2011.01)
*H04N 21/8545* (2011.01)
*H04N 21/2743* (2011.01)

(58) Field of Classification Search
CPC ......... H04N 21/4667; H04N 21/47217; H04N 21/4756; G06Q 20/22; G06Q 20/0855; G06Q 20/123; G06Q 20/29; G06Q 20/02
See application file for complete search history.

(56) References Cited

U.S. PATENT DOCUMENTS

| | | | |
|---|---|---|---|
| 7,508,452 B2 | 3/2009 | Mori et al. | |
| 2002/0138827 A1 | 9/2002 | Yoshimine et al. | |
| 2003/0056214 A1 | 3/2003 | Yuasa et al. | |
| 2003/0149618 A1 | 8/2003 | Sender et al. | |
| 2007/0156594 A1 | 7/2007 | McGucken | |
| 2009/0271283 A1* | 10/2009 | Fosnacht | G06Q 30/0601 705/26.1 |
| 2010/0010921 A1 | 1/2010 | Liu et al. | |
| 2011/0191246 A1 | 8/2011 | Brandstetter et al. | |
| 2012/0254925 A1 | 10/2012 | Nassiri | |
| 2013/0111602 A1 | 5/2013 | Sidi et al. | |
| 2013/0253993 A1* | 9/2013 | Brower | G06Q 20/123 705/12 |
| 2016/0063581 A1 | 3/2016 | Traina et al. | |
| 2016/0350795 A1 | 12/2016 | Brown | |

FOREIGN PATENT DOCUMENTS

| | | |
|---|---|---|
| JP | 2002-101399 A | 4/2002 |
| JP | 2012-120098 A | 6/2012 |
| JP | 6157711 B1 | 7/2017 |
| JP | 6574919 B1 | 9/2019 |
| WO | 2004044770 A1 | 5/2004 |
| WO | 2017217521 A1 | 12/2017 |
| WO | 2019082409 A1 | 5/2019 |
| WO | 2019083018 A2 | 5/2019 |

OTHER PUBLICATIONS

Extended European Search Report dated Jul. 23, 2020 in EP Application No. 18869663.7.
Office Action dated Jul. 2, 2020 in CA Application No. 3080637.
Int'l Search Report dated Jun. 5, 2018 in Int'l Application No. PCT/JP2018/011619.
Guide to Buying on Bandcamp, Apr. 2016, downloaded from webpage: https://web.archive.org/web/20160420115219/http://somethingwecando.org/jp/guide.html, Download date: May 16, 2018, 8 pages.
Internet Archive: Wayback Machine, downloaded from web page: URL:https://archive.org/web/web.php, Download date: May 16, 2018, 1 page.
Wayback Machine, downloaded from web page: https://web.archive.org/web/2016051500000/http://somethingwecando.org/jp/guide.html, Download date: May 16, 2018, 4 pages.
Introducing YouTube Red Original Series, Movies from your favorite stars, YouTube Official 8109, Oct. 2015, downloaded from web page: URL:https://youtube.googleblog.com/2015/10/red-originals.html, Download date: May 16, 2018, 7 pages.
Cranz Inc., "800 Specially Selected Apps for the Latest iPad," p. 56 (Feb. 2013).
Hayakawa, "The New Standard! iPhone App Guide, 2014 Edition," Ed. 1, p. 227 (May 2014).
Kimura et al, "User evaluations on the video recommender system using field experiment," IEICE Technical Report, vol. 112, No. 35, pp. 79-83 (May 2012).
Int'l Search Report and Written Opinion dated Apr. 16, 2018 in Int'l Application No. PCT/JP2018/039899, translation of Search report only.
Office Action dated Dec. 18, 2020 in U.S. Appl. No. 16/971,666, by Kiyooka.

* cited by examiner

Receiving an amount of tipping

▽ Yearly  ▽ July 2017 (Monthly)  [Tip Thanks!]

| Video No. | | | Quantity | Amount (USD) | Revenue(60%) Amount (USD) | |
|---|---|---|---|---|---|---|
| ajd1908088 | [img 06:44] | Title1<br>2 months ago  Views : 8 | 53 | 76.00 | 45.60 | Details |
| ajd1908878 | [img 03:25] | Title2<br>3 months ago  Views : 1 | 88 | 121.00 | 72.60 | Details |
| ajd17980678 | [img 06:19] | Title3<br>12 hours ago  Views : 9 | 22 | 38.00 | 22.80 | Details |
| ajd15970670 | [img 05:13] | Title4<br>2 weeks ago  Views : 0 | 156 | 238.00 | 142.80 | Details |
| ajd14376672 | [img 06:19] | Title5<br>3 weeks ago  Views : 1 | 2,869 | 4,289.00 | 2,573.40 | Details |
| | | Total | 3,188 | 4,762.00 | 2,857.20 | Details |

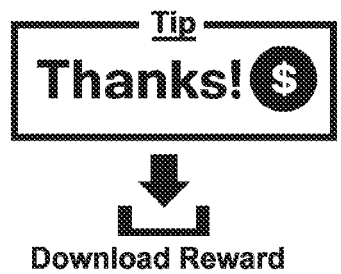
Fig.19A
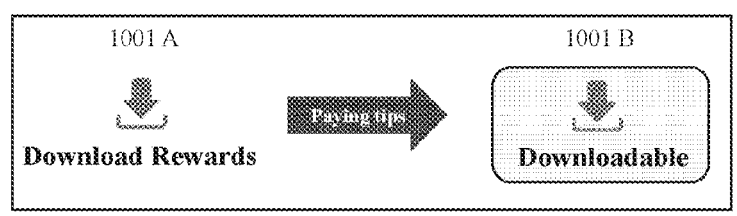
Fig.19B
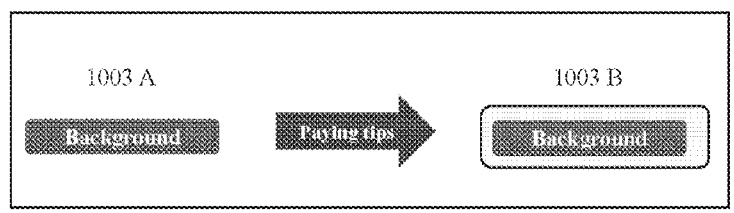
Fig.19C
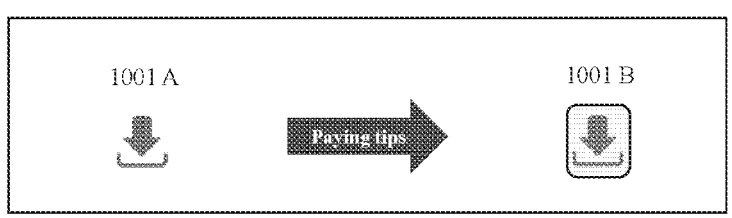
Fig.19D
FIG.19

VIDEO STREAMING PLAYBACK SYSTEM AND METHOD

CROSS-REFERENCE TO RELATED APPLICATION

This application is a continuation-in-part application of U.S. patent application Ser. No. 16/643,310, which is a Section 371 of International Application No. PCT/JP2018/039899, filed Oct. 26, 2018, which was published in the Japanese language on May 2, 2019 under International Publication No. WO 2019/083018 A1, which claims the benefit of U.S. Provisional Application No. 62/577,924, filed Oct. 27, 2017. This application also claims priority to International Application No. PCT/JP2018/011619, filed Mar. 23, 2018. The present application claims the benefit of each of the above-identified applications. The disclosures of each of the above-mentioned applications are incorporated herein by reference in their entirety.

FIELD OF THE INVENTION

The present invention pertains to a video streaming playback system for providing video hosting service, and to a method for the same.

BACKGROUND OF THE INVENTION

Recently, there are numerous services for video hosting websites; because of their convenience, these services have been attracting increasing numbers of users from year to year, and are recognized by society at large.

Video hosting website services can be broadly divided into two types.

One type is video hosting sites of the ad-supported model, in which users can watch videos for free in return for viewing ads (videos/images/audio/text); examples of these services include YouTube, Facebook video, and dailymotion (all registered trademarks). The other type is the subscription-based model, in which users pay a fee to watch videos; examples of these services include NetFlix, Amazon Video, and YouTube Red (all registered trademarks).

Video hosting websites of the first type, the ad-supported model, have the drawback that, while users can view videos for free, many users are annoyed by the ads on the video sites. Ads on video sites are primarily online targeted advertising, wherein a user's video watching history and the user's residence (geographical location; determined from the IP address of the site connection), age, sex, etc., are determined, and, based on this information, the site operator shows ads to the targeted users requested by the advertiser. This arrangement allows for highly cost-effective advertising. However, this also means that the disclosure and collection of private information is the price users pay to view videos for free. Moreover, no matter how advanced online targeted ad technology may become, users simply want to watch videos, and it is natural for users to be annoyed by their videos being interrupted by ads.

Moreover, in the ad-supported model, it is difficult for a user to confirm the quality of video content before viewing the video, and some content creators, taking advantage of the way the ad-supported model works, put extreme titles and thumbnails on videos of low content quality to attract users, and there are also numerous fake videos and ad videos that profiteer off the ad revenue from the video ads that play before a video is viewed.

As concerns video ratings, the ratings of good (Like) and bad (Dislike) on YouTube and Facebook Video, for example, are based merely on the subjective impressions of individual users, and are not theoretical.

In addition, video hosting websites of the ad-supported model present the problem of forbidding the downloading and saving of all videos, including videos for which copyright ownership has been made explicit, on user terminals. Such websites also prevent background playback, which would allow a user to listen to video music while in another browser or application. The reason for this is that downloading and saving videos to personal terminal allows users to view videos offline, which means circumventing highly cost-effective online targeted advertising and making it difficult to obtain ad revenue. In addition, for users to listen to video music in the background, without visiting the video site, means circumventing advertising. In fact, YouTube has rolled out another video service (YouTube Red) that is ad-free and enables downloading and saving of videos and background playback for a subscription (monthly), which shows that subscription services must take the place of ad revenue in order to provide ad-free service that offers video downloading and saving and background playback.

Meanwhile, video hosting websites of the subscription-based model do not disclose the contents of videos, and are configured so that viewers have no way of knowing the contents of video content, and must pay a fee unilaterally set by the video site before having any way of knowing the value of videos. On paid sites, users have no way of judging the value of video content, and must pay a unilaterally set fee in advance, which is not a fair transaction, and subjects users to risk.

SUMMARY OF THE INVENTION

Problem to be Solved by the Invention

As explained above, current video hosting websites present problems such as ads, invasion of privacy, the need to pay fees in advance, and the presence of fake videos and ad videos. An object of the present invention is to solve these problems, and provide an arrangement that enables video hosting website operators and content creators to obtain revenue.

Means for Solving the Problem

In order to achieve the object proposed above, a first aspect of the present invention provides a video streaming playback system comprising:
  a video playback module, configured to provide a video that was previously uploaded to a specific video hosting site by a video provider on a user interface displayed on a computer of a content consumer so as to enable streaming playback of the video over an electronic network, the video playback module having a video playback operation to allow the video to be played on the user interface;
  a tipping module configured to operate in tandem with the video playback operation performed by the video playback module, the tipping module configured to perform a tipping process;
  a reward download button/link display module configured to operate in tandem with the tipping process performed by the tipping module;

a setup interface configured for the video provider to select to offer a reward or not offer a reward for the video which the video provider has uploaded upon payment of a tip;

wherein the tipping module comprises:
a tipping button/link display module configured to display an activated tipping button/link on the user interface; and
a tip processing module configured to, in response to the content consumer operating the activated tipping button/link, process payment of a tip of a specific amount according to a default setting or a setting made by the video provider;
wherein the reward download button/link display module is configured to, in response to a tip payment process being executed for the video,
display an activated reward download button/link on the user interface when the video provider has selected using the setup interface to offer a reward upon payment of a tip, or has not selected using the setup interface to not offer a reward upon payment of a tip, and
not display an activated reward download button/link on the user interface when the video provider has not selected using the setup interface to offer a reward upon payment of a tip, or has selected using the setup interface to not offer a reward upon payment of a tip.

In accordance with a preferred embodiment of the present invention, this system allows downloading of a video file to the computer of the content consumer by operating the activated reward download button/link displayed on the user interface.

In accordance with a preferred embodiment of the present invention, the system further comprises:
an ad module configured to operate in tandem with the video playback operation performed by the video playback module; and
a video provision options control module for allowing the video provider to select options pertaining to the operation of the tipping module, the reward download button/link display module, and the ad module;
wherein the video provision options control module provides a setup interface configured to display, to the video provider, options of:
(1) whether to accept tips by operating the tipping module,
(2) whether to permit to offer a reward by operating the reward download button/link display module, and
(3) whether to display ads by operating the ad module; and
wherein the video provision options control module enables a selection at option (2) and prohibits a selection at option (3) and the operation of the ad module when a selection of accepting tips has been made at option (1); and prohibits the operation of the tipping module and the reward download button/link display module, and enables a selection at option (3) when a selection of not accepting tips has been made at option (1); and
wherein the ad module displays, in tandem with the video playback operation performed by the video playback module, a specific ad on the user interface before and/or during the video playback when the option (3) is selected.

In accordance with a preferred embodiment of the present invention, the tipping module further comprises a video rating generation module that, in response to the tipping process being executed for the video, generates a rating for the video, associates the rating with the video, and stores the rating so as to be displayable to all content consumers on the user interface, and, when a selection is made to accept tips for option (1), the video provision options control module displays the video rating generated by the video rating generation module on the user interface.

In this case, it is preferable that the video rating generation module calculate a tipping frequency (payment count÷view count), and generate the video rating on the basis of the tipping frequency. It is more preferable that the video rating be displayed on the user interface so as to be displayable to all content consumers in the form of a number (numerical value) or stars (number of stars).

A second main aspect of the present invention is a video streaming playback method that uses a video streaming playback system including (i) a video playback module for providing a video that was previously uploaded to a specific video hosting site by a video provider on a user interface displayed on a computer of a content consumer so as to enable streaming playback of the video over an electronic network, the video playback module having a video playback operation to allow the video to be played on the user interface; (ii) a tipping module that operates in tandem with the video playback operation performed by the video playback module, the tipping module configured to perform a tipping process; and (iii) a reward download button/link display module configured to operate in tandem with the tipping process performed by the tipping module;
the video streaming playback method comprising:
a step, executed by the video streaming playback system, of
providing a setup interface configured for the video provider to select to offer a reward or not offer a reward for the video which the video provider has uploaded upon payment of a tip;
steps, executed by the tipping module, of
displaying an activated tipping button/link on the user interface; and
in response to the content consumer operating the activated tipping button/link, processing payment of a tip of a specific amount according to a default setting or a setting made by the video provider; and
a step, executed by the reward download button/link display module, of:
in response to a tip payment process being executed for the video, displaying an activated reward download button/link on the user interface when the video provider has selected using the setup interface to offer a reward upon payment of a tip, or has not selected using the setup interface to not offer a reward upon payment of a tip;
wherein an activated reward download button/link is not displayed on the user interface when the video provider has not selected using the setup interface to offer a reward upon payment of a tip, or has selected using the setup interface to not offer a reward upon payment of a tip.

Characteristics other than those set forth above will be apparent from the following description and drawings of embodiments of the invention.

BRIEF DESCRIPTION OF THE DRAWINGS

FIG. 14 is a schematic illustration of a dashboard screen of a video owner.

Figure 15:
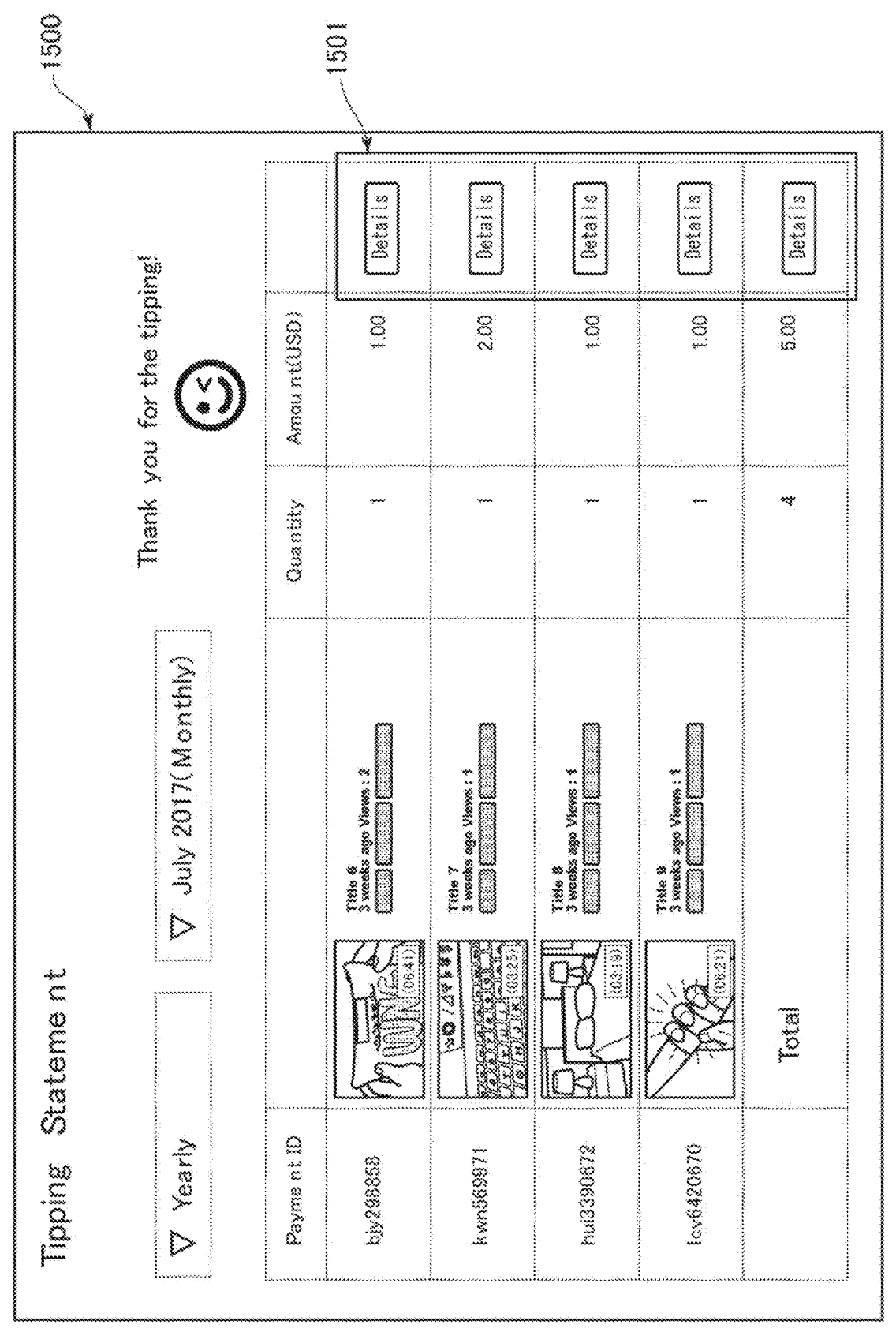

FIG. 15 is a schematic illustration of a tip statement screen.

FIG. 16 is a schematic illustration of a video management screen.

FIG. 19 is a schematic illustration of a video playback interface.

FIG. 26A is a schematic illustration of a video upload settings screen.

FIG. 26B is a schematic illustration of a video upload settings screen.

BEST MODE FOR EMBODYING THE INVENTION

An embodiment of the present invention will be described hereafter.

Figure 1:
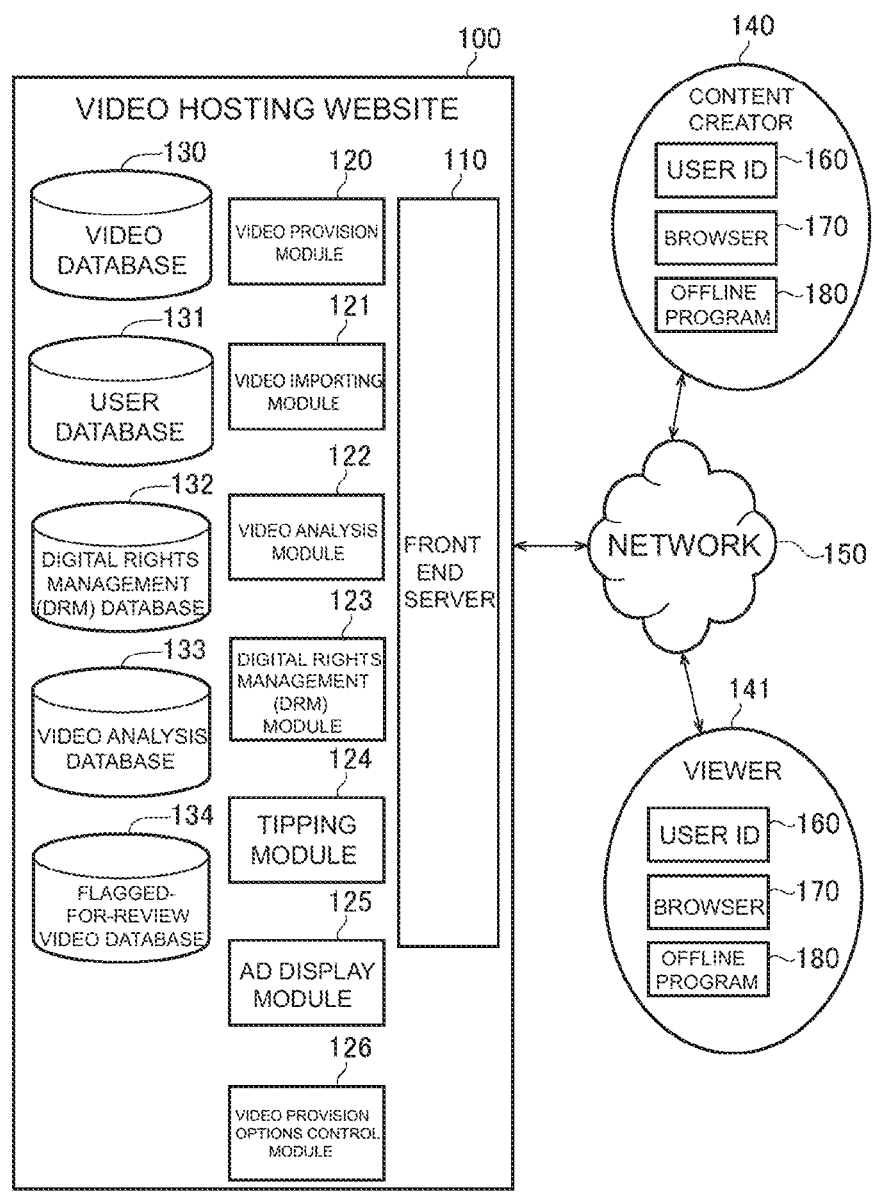
FIG. 1 is a schematic illustration of the system configuration of a video hosting server according to one example of the present invention.

FIG. 1 is an illustration of a system configuration according to the present embodiment.

1. System/Server Configuration

A video hosting website 100 (the system of the present invention) comprises: a front end server 110 for providing a user interface; and, as a back end for processing video playback and tipping processes, a video provision module 120, a video importing module 121, a video analysis module 122, a digital rights management (DRM) module 123, a tipping module 124, an ad display module 125, a video provision options control module 126, and various databases including a video database 130, a user database 131, a digital rights management database 132, a video analysis database 133, and a flagged-for-review video database 134.

Numerous functions known in the art, such as firewall, load balancer, application server, authentication server, fault bypass server, and site management tools, will not be shown in the present embodiment in order to avoid confusion regarding the characteristics of the present invention, but naturally may be provided, as appropriate.

The front end server 110 and the modules 120-125 are installed as a program executed by the computer making up the video hosting website 100; this program is expanded in memory by the CPU of the computer in which the program is installed, and executed, as appropriate, to form the various elements of the present invention. The computer on which the server program is installed is preferably a server-class computer comprising a network interface, a peripheral interface, and other elements known in the art. For example, the computer runs on an operating system, such as Linux®, comprising a generally high-performance CPU and a disk storage device for memory. Other types of computers may of course be used, and it is anticipated that more powerful computers developed in the future can be configured as described herein. It is also possible to provide a function installed through one of the elements using a computer program product stored on a computer-readable physical storage medium (e.g., ROM, RAM, hard disk, SSD, or magneto-optical medium).

The video hosting website 100 is connected via a network 150 to a content creator (individual, corporation, group) 140 and a viewer (individual, corporation, group) 141 constituting users. The content creator 140 and the viewer 141 run a browser 170 on a computer, portable terminal, etc., and connect to the front end server 110 over the network 150. Typically, the network 150 is the Internet, but may include any combination of LANs, MANs, WANs, mobile, wired or wireless networks, private networks, cellular networks (e.g., the Long-Term Evolution (LTE) network), CDNs (content delivery networks), and virtual private networks. The front end server system 110 can be connected to over the network 150, which can be any network, without limitation.

In FIG. 1, the content creator 140 and viewer 141 constituting the users of the video hosting website 100, as well as their respective user ID 160, browsers 170, and offline programs 180 are shown as single units; however, it goes without saying that an extremely large number (for example, millions) of users can be supported and allowed to communicate with the video hosting website 100 at any time. The users 140, 141 may include a variety of different computer devices. Examples of the user devices 140, 141 include PCs, laptops, smartphones, tablets, information terminals, portable information terminals, portable telephones, mobile telephones, etc. The technology of said field is naturally not limited to the abovementioned devices.

The browser 170 can include any application by which a user can access web pages on the World Wide Web. Suitable applications are Apple Safari®, Google Chrome®, Android®, Microsoft Edge®, Internet Explorer®, and any applications adapted so as to be capable of accessing web pages on the World Wide Web, including smartphone and tablet application software. The browser 170 also includes suitable video players, such as HTML5 Player and Adobe Systems' Flash (both registered trademarks), as well as any other player that is usable on the video hosting web site 100 and compatible with video film format. Alternatively, a standalone program independent of the browser 170 may access videos.

Records of all registered users, including the content creator 140 and viewer 141, are registered and saved in the user database 131 of the video hosting website. The video hosting website 100 maintains records of all registered users using this user database 131. Names, user names, channel names, passwords, email addresses, tip payment information (credit card numbers, online payment information, etc.), tipping settings, tip receipt information (bank account, etc.), tipping records, tip receipt records, private coin information, video viewing records, video upload records, video upload records, video upload settings, uploaded video ratings, rights records, violation records, and ad settings information (whether or not the user wishes to receive ad revenue for uploaded videos, and settings for doing so) are stored in the records for the registered users. Records are also included for users who simply watch videos without being registered on the video site 100.

2. Site Registration and User ID

It is general practice in web service user registration, not limited to the video hosting website 100, to identify users by email address, telephone number, and registered social media accounts (Facebook, etc.), and later input the information necessary to use the site services, such as legal name, sex, address, payment information, user name, channel name, etc., to register with the site. After registering with the site, a user is given an ID (identifier) 160, and can utilize the services of the video hosting website 100.

As this method of site registration and ID 160 acquisition is standard for website registration at present, it will not be shown in order to avoid confusion regarding the characteristics of the system of the present invention. Other methods of website registration and ID acquisition invented in the future will be applicable to the system of the present invention as long as they are methods in which users are identified by user IDs.

3. Unregistered Site Users

Users not registered with the video hosting website 100 can view videos, but must register with the video hosting website 100 and obtain a user ID 160 in order to utilize services such as paying tips, accepting tips, uploading videos, downloading videos, offline playback, background playback, and posting comments; thus, the operator of the video hosting website 100, through the user interface (not shown) on the front end server 110, notifies unregistered users of the option of registering with the site, and encourages them to do so.

4. Uploading Videos

A registered user is capable of becoming a content creator 140; to upload digital content to the video hosting website 100, the content creator 140 connects over the network 150 to the video importing module 121 via a video settings user interface 900 (FIG. 9) generated by the front end server 110. The user interface 900 can be accessed by, for example, clicking the "Upload" button 402 in the video viewing interface shown in FIG. 4.

When the content creator 140 clicks the "Upload" button 402 in the user interface, it is confirmed whether the provided is logged into the video hosting website 100. If the content creator 140 is logged in, the user ID 160 is identified, and if the content creator 140 is not logged in, a login page is displayed (not shown in the drawings), the provider is made to log in, and the user ID 160 is identified. Unregistered users of the video hosting website 100 are directed to a user registration page (not shown in the drawings) to register as a user and obtain a user ID 160, after which the user ID 160 is identified at login.

Figure 9:
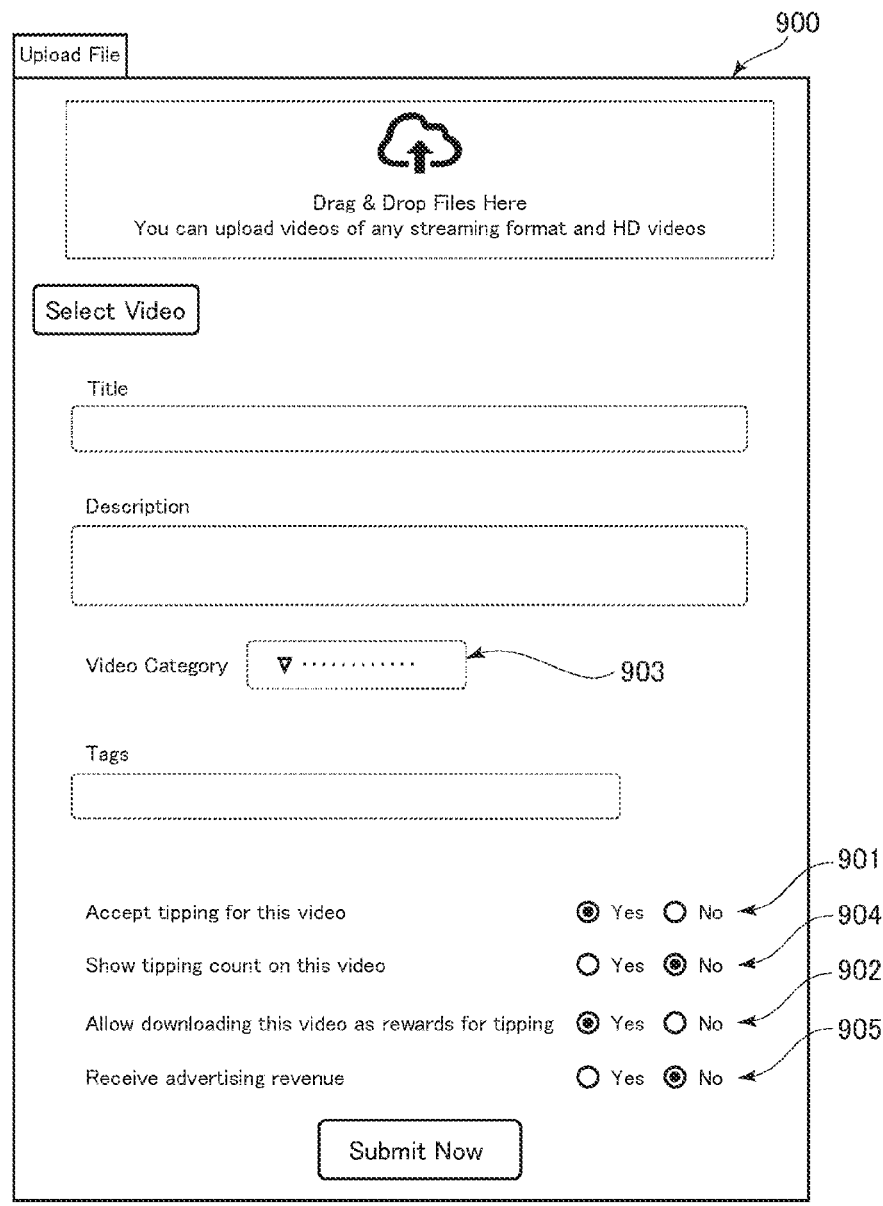
FIG. 9 is a schematic illustration of a video upload setting screen.

In the user interface 900 shown in FIG. 9, the video to upload can be designated by selecting the storage location of the video or dragging and dropping the file, and video title, description, tags, and category (903) can be designated. One can also specify (901) whether to accept tips for the video (selection for "Accept tipping for this video" (Yes/No)), (904) whether to display the number of received tips (selection for "Show tipping count on this video" (Yes/No)), (905) whether to accept ad revenue (selection for "Receive advertising revenue" (Yes/No)), and selecting (Yes/No) whether to offer a download reward whereby (902) users who have tipped are permitted to download the video (reward offered). When the "Submit Now" button in the interface is pressed, the video importing module stores the designated video in the video database 130 along with the conditions specified in the interface.

The video importing module 121 also assigns an ID (identifier) to and performs initial processing upon the uploaded video. This processing includes format conversion (encoding, transcoding) and compression. The processing also includes data processing involving tagging the user ID 160, video ID, tipping settings set in the user interface, as well as metadata such as video title, description, tags, categories, language, geo-blocking, age restrictions, and video length.

Examples of uploaded digital content items include video, audio, and combinations of video and audio. Alternatively, the digital content item may be a still image such as a JPEG or GIF file, or a text file. The item may of course also be live video (streaming data). For simplicity and to describe the present embodiment, the uploaded digital content item will be referred to as a "video", a "video file", "video data", or a "video item", but these terms are not intended to limit the types of digital content items that can be uploaded.

The video analysis module 122 then analyzes the tagged metadata. For this analysis, the module checks for any prohibited words, violence, sexual content, etc., violating terms that have been set by the video hosting website 100 and stored in the video analysis database 133, and also checks for copyrights. Video metadata for previous violations of terms is stored in the video analysis database 133, as is copyright information independently obtained by the operator of the video hosting website 100. Information on movie companies, music labels, television stations, artists, and other music copyright holder registered with the video hosting website 100 as users is also converted to metadata and stored, and copyright infringements are also checked for. After analysis, the digital rights management (DRM) module 123 performs an encryption process (download-blocking encryption process) on non-problematic videos to block downloading of the video data to user terminals, and a decryption key for unblocking is simultaneously issued. After the encryption process, the video data is stored in the video database 130, and the unblocking decryption key is stored in the digital rights management (DRM) database 132. The uploaded video is also associated with the content creator 140, and the record in the user database 131 is updated and saved.

Videos that are judged problematic are stored in the flagged-for-review video database 134, and the operator of the video hosting website 100 checks the video again, and, if there are no problems, the digital rights management (DRM) module 123 performs the encryption process for blocking downloads of the video data to user terminals as described above, and simultaneously issues a decryption key for unblocking. After the encryption process, the video is stored in the video database 130, and the unblocking decryption key is stored in the digital rights management (DRM) database 132. The uploaded video is also associated with the content creator 140, and the record in the user database 131 is updated.

Problematic videos are deleted after being checked by the operator of the video hosting website 100; in this system, metadata for problematic videos is stored in the video analysis database 133 as violation data, and the user violation history in the user database 131 is updated.

In this system, the encryption used by the digital rights management (DRM) module 123 to block downloading of videos to user terminals is carried out through a combination of a process that prevents displaying the video on the user browser 170 and a process that prevents the video player from running in the event that the user manages to download the video. If a user attempts to use downloading software to download the video, a warning text is displayed, and, simultaneously, the user violation history for the user ID 160 that attempted the download is updated in the user database 131, and a notification is sent to the operator of the video hosting website 100. The IP address, browser, model information, and terminal number of users not registered with the video hosting website 100 are recorded and saved in the user database 131, and such users are registered as risky users. There are many other methods that can be used for this video content protection through digital rights management (DRM); as demanded by circumstances, the operator of the video hosting website 100 may utilize an optimal method, and set the same in the digital rights management (DRM) module 123.

Video authorship is made up of extremely complex rights, and it may in practice be difficult to detect all copyright infringements using just the video analysis module 122 and the video analysis database 133. Therefore, the video hosting website 100 makes final patrol-based checks, responds to infringement notifications from external parties on a case-by-case basis, and, as necessary, deletes videos and freezes or deletes user IDs 160.

5. Viewing Videos

The viewer 141 can run the browser 170 and connect to the front end server 110 to view videos that have been uploaded by the content creator 140 to the video database 130.

Figure 4:
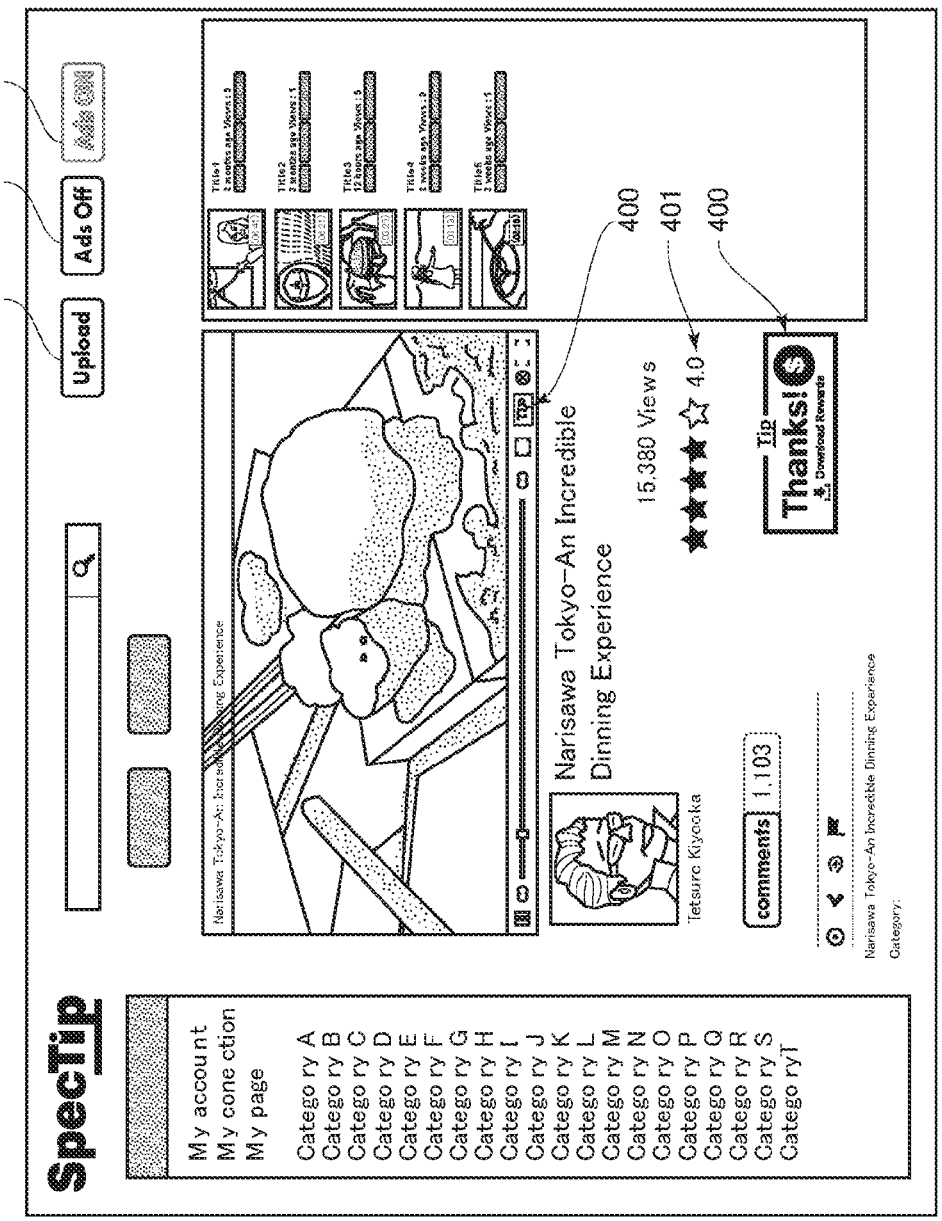
FIG. 4 is a schematic illustration of a video playback interface of the same.

Using the interface displayed by the front end server 110 as illustrated in FIG. 4, the viewer 141 selects and views posted videos according to category, view count ranking, rating ranking, and the settings and video viewing history of the viewer 141, or the viewer 141 inputs search words into a video search system on the front end server 110, videos (titles, descriptions, artist names, tags, etc.) matching the metadata stored and distributed by the video database 130 and the search words inputted by the viewer 141 are displayed as search results, and the viewer 141 selects and views a video. When the viewer 141 selects a video, the video ID is sent to the video provision module 120, the video data is retrieved from the video database 130, and the video provision module 120 sends the video data to the viewer 141 for viewing.

As these methods of selecting and searching for videos are standard on video hosting websites, they will not be shown in order to avoid confusion regarding the characteristics of the present invention.

The video view count by viewers 141 is recorded by the video provision module 120, and stored in the video database 130 in association with the video.

6. Video Playback and Tipping Module

Figure 2:
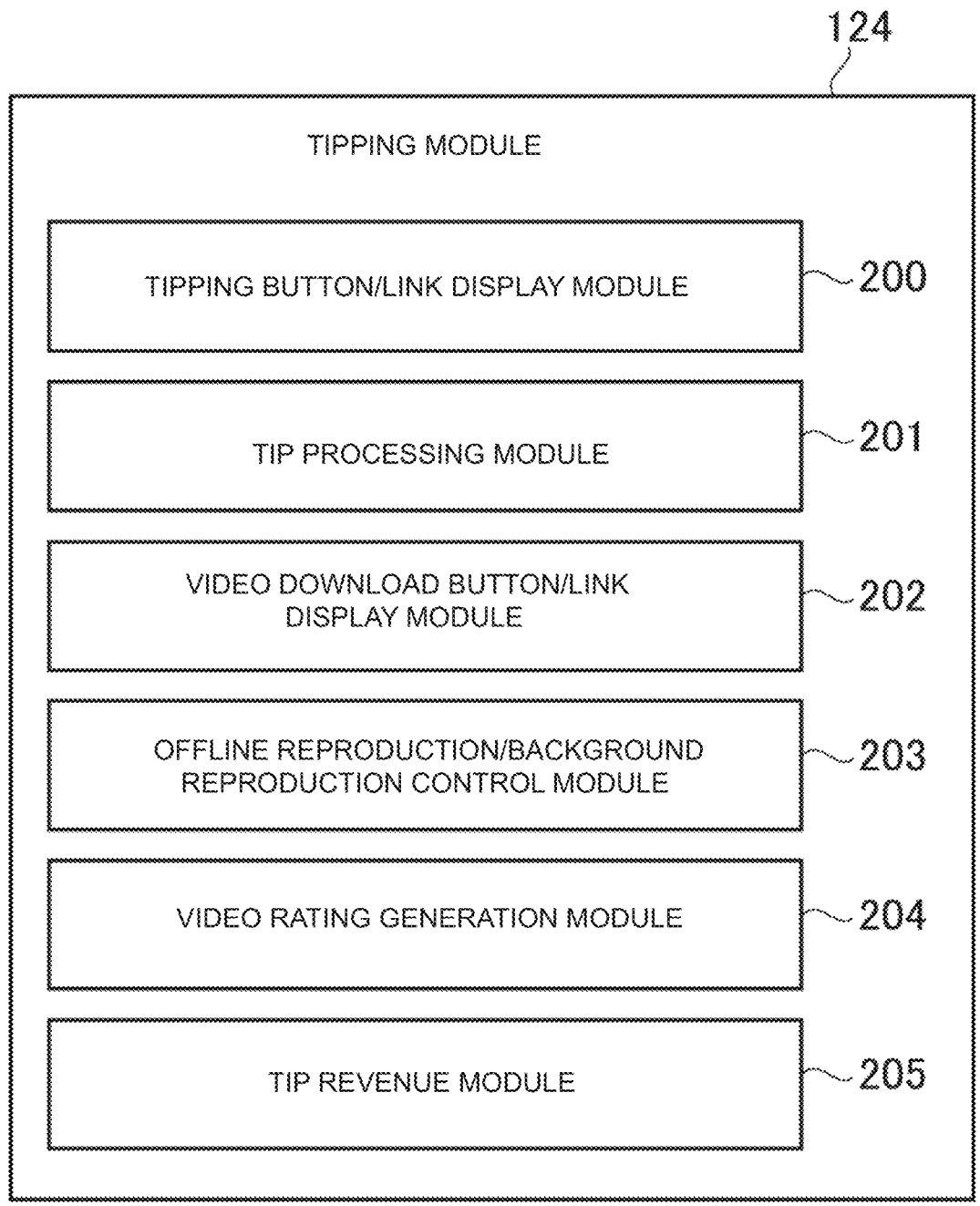
FIG. 2 is a schematic illustration of a tipping module of the same.

FIG. 2 is a block diagram of the tipping module 124 shown in FIG. 1.

In the embodiment shown in FIG. 2, the tipping module 124 comprises a tipping button/link display module 200, a tip processing module 201, a video download button/link display module 202, an offline playback/background playback control module 203, a video rating generation module 204, and a tip revenue module 205.

Figure 3:
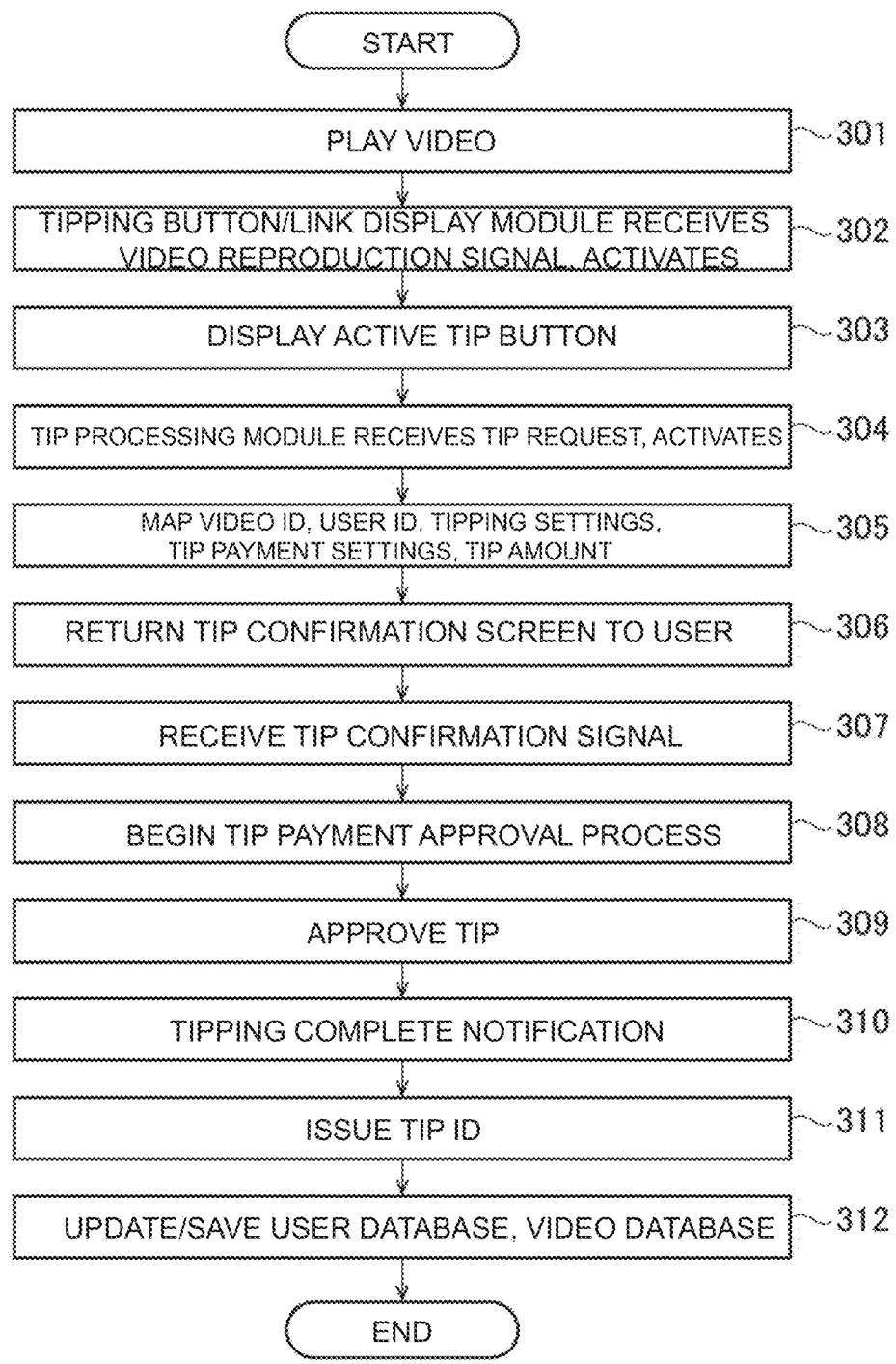
FIG. 3 is a flowchart of a video playback process in the same.

FIG. 3 is a flow chart of a process performed by the tipping module 124.

When the video selected by the viewer 141 is played back (step 301 in FIG. 3), the tipping button/link display module 200 receives a video playback signal and operates (step 302), and, as a result of the setting regarding (901) whether to accept tips in the video uploading interface 900 being set to accept payments (Yes), an active tip button 400 is displayed (step 303) as shown in FIG. 4, enabling the viewer 141 to leave a tip. Because other, conflicting remuneration payment means, such as the ad display module 125 in this example, are provided in the system of the present invention, the tipping button/link display module 200 stops the operation or inhibits the activation of the ad display module 125 so that no ads (of any sort, including in-stream ads) are displayed. In the present embodiment, in other words, the tip processing module operates either the tipping button/link display module 200 or the ad display module 125 according to the setting (Yes or No) regarding (901) whether to accept tips.

The ad display module 125 displays ads (in-stream ads, etc.) based on the information registered for a user over videos uploaded by the user as the videos are being played back, and may have the same configuration as in existing ad-supported video hosting websites.

When the ad display module 125 operates, for example, an "Ads off" button 403 as shown to the side of the "Upload" button 402 in FIG. 4 is provided, the button being configured so as to halt the operation of the ad display module 125 and run the tipping button/link display module 200. The operator may also set a single such button for the video hosting website (video sharing website) as a whole. When the tipping button/link display module 200 is operating, an "Ads ON" button 404 as shown in FIG. 4 may be displayed, the button being configured so as to halt the operation of the tipping button/link display module 200 and run the ad display module 125, the opposite of the process described above, when pressed. In such a case, one or the other of the tip accepting setting 901 and the ad revenue receiving setting 905, which operate in tandem, operates as described above, and 902, 904 also operate in tandem as described above. As a result, when the operation of the ad display module 125 is stopped using the "Ads Off" button 403, and the tipping button/link display module 200, which is one exclusive option, operates, the tip acceptance setting 901 is forcibly set to Yes, and the ad revenue receiving setting 905 is forcibly set to No, and cannot be selected by the content creator 140. As a result, the video hosting website (video sharing website) becomes completely ad-free, including in-stream ads. In this case (ad-free, ad revenue accepting setting 905 set to No), the content creator 140 uses the user interface 902 to select whether to allow downloading of a video for which a tip has been given to a user terminal as a reward (rewards on) or not to allow such downloading (rewards off).

Next, when the viewer 141 clicks on the tip button 400, the tip processing module 201 operates in response to the tip request (step 304), the tip processing module 201 maps video ID, user ID 160, tipping settings, tip payment settings, and tip amount settings (step 305), and a tipping details confirmation screen not shown in the drawings is returned to the viewer 141 (step 306).

Figure 7:
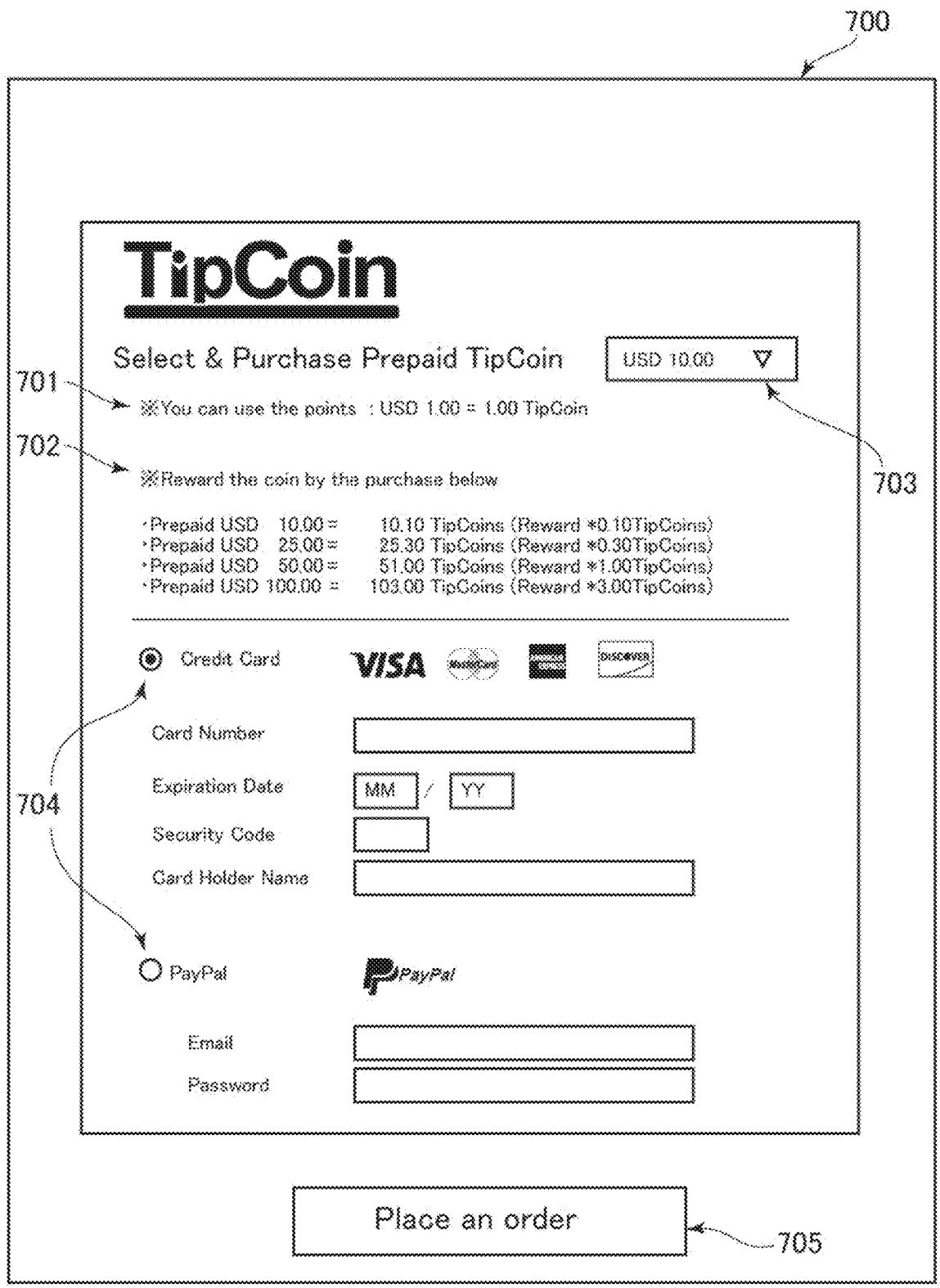
FIG. 7 is a schematic illustration of a tip setting screen.

When the viewer 141 has confirmed the tip details and clicks the confirm tip button (not shown), the tip processing module 201 receives the confirmation signal (step 307) and starts a payment approval process for the tip from the viewer 141 (step 308). If the tipping settings of the viewer 141 are set to prepaid tip coins, the number of prepaid tip coins in the wallet of the viewer 141 is confirmed in the user database 131, the number of coins requested by the viewer 141 is withdrawn, and payment with prepaid tip coins is approved (step 309). If the viewer 141 has insufficient prepaid tip coins, and the number of tip coins requested by the viewer 141 cannot be paid, the user interface 700 for purchasing prepaid tip coins shown in FIG. 7 is displayed, and the viewer 141 is directed to purchase prepaid tip coins.

Figure 6:
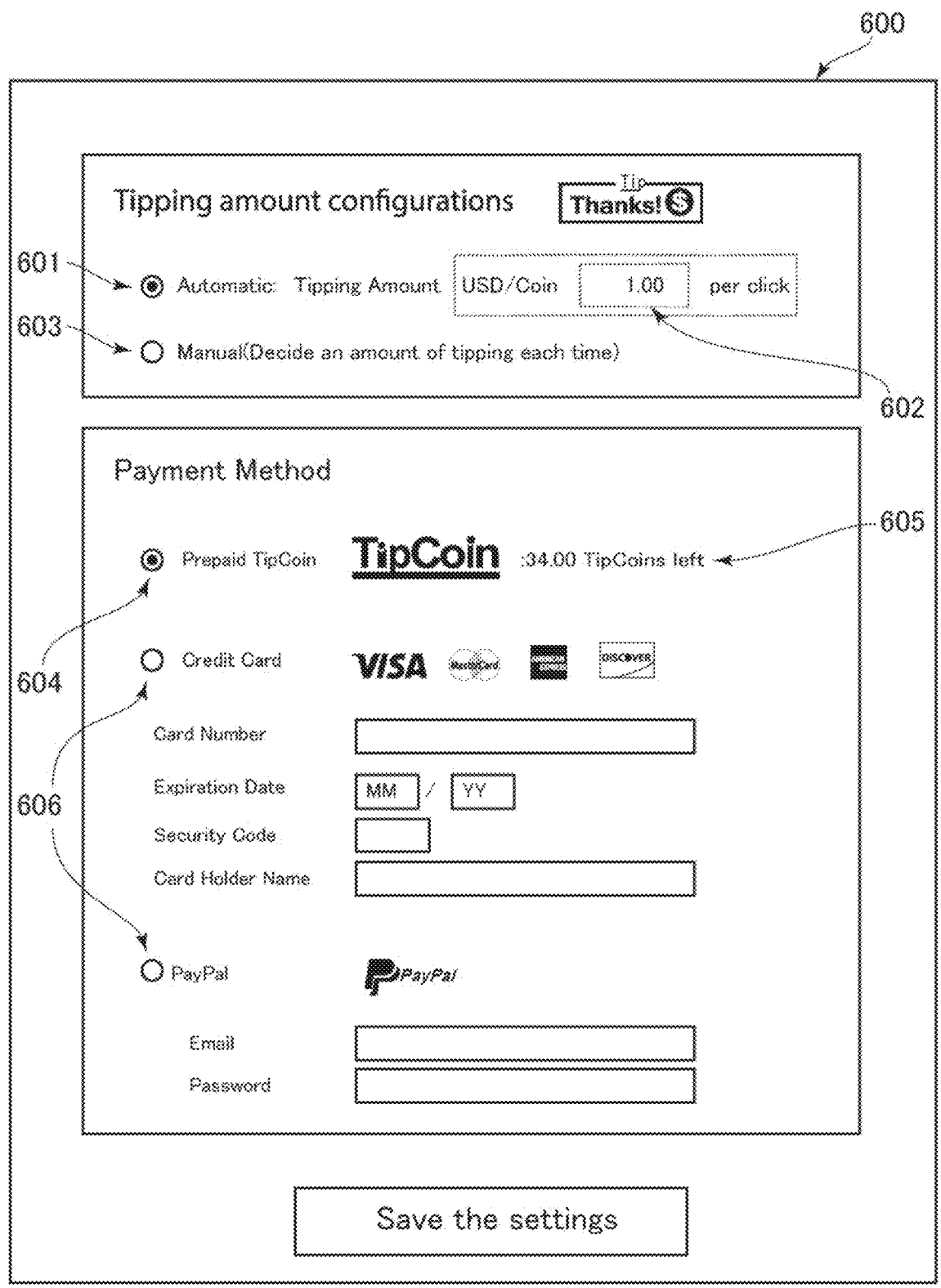
FIG. 6 is a schematic illustration of a payment means setting screen.

The number of prepaid tip coins in the wallet of the viewer 141 is displayed on the user interface 605 shown in FIG. 6. If the tipping settings of the viewer 141 are set to credit card, electronic payment, or the like, the tipping processor 201 sends a payment approval request to the payment company, and obtains payment approval from the payment company (step 309). If the payment cannot be approved, a payment error message (not shown) is displayed to the viewer 141. When the tip payment has been approved, a tipping complete message is displayed to the viewer 141 (step 310), a tip ID is simultaneously issued (step 311), and the information in the user database 131 and the video database 130 are updated and saved in association with the user ID 160 and the video ID (step 312).

Figure 5:
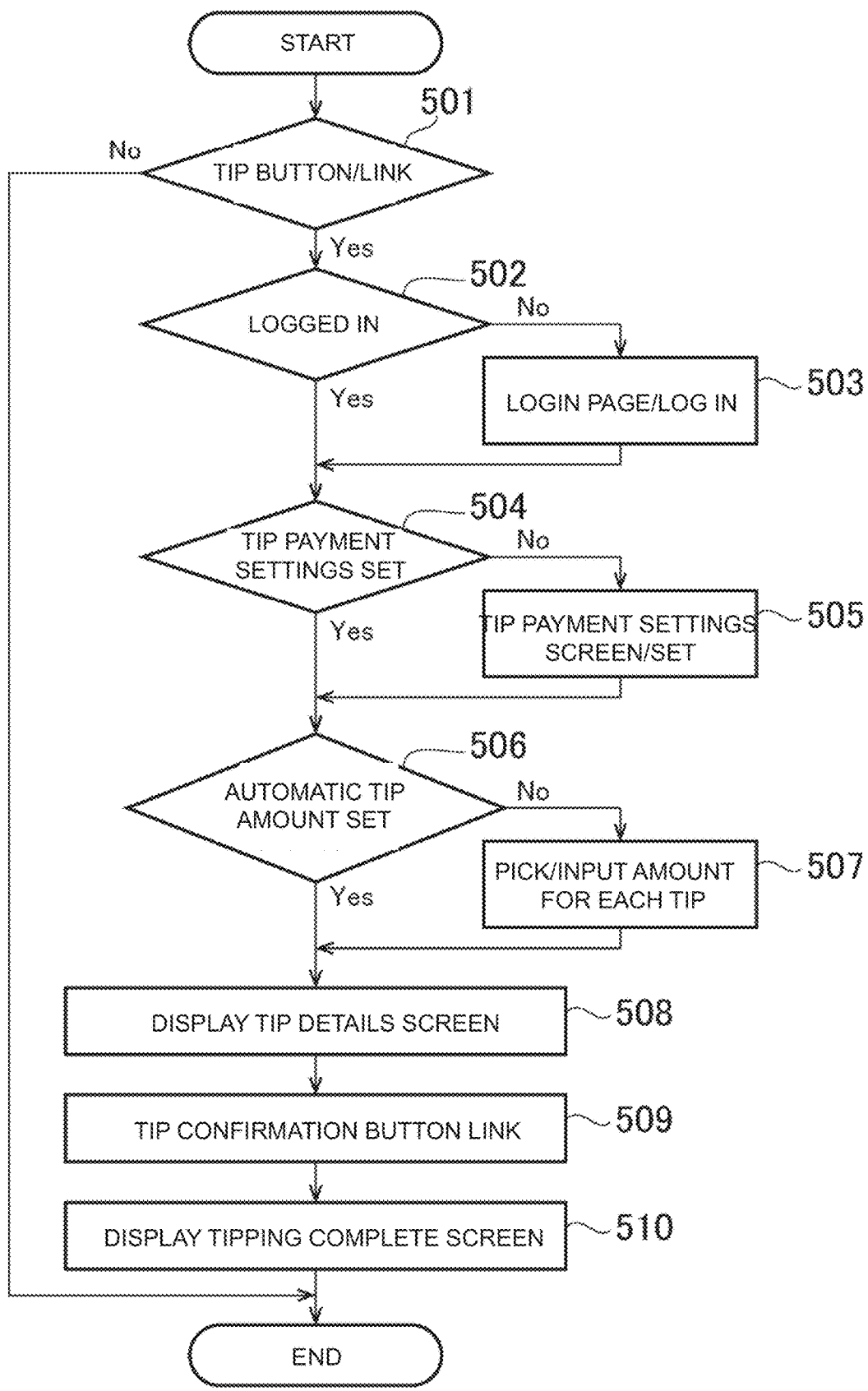
FIG. 5 is a flowchart of a tipping process in the same.

FIG. 5 is a flow chart of a tipping process accompanied by tipping settings of the viewer 141 that accompany the flow of the process performed by the tipping module 124 in FIG. 3.

When the video starts playing and the viewer 141 clicks the active tip button 400 (FIG. 4) (step 501), the process continues to step 502, and the tip processing module 201 confirms whether the viewer 141 is logged into the video hosting website 100. If the viewer 141 is logged in, the user ID 160 is identified, and, if the viewer 141 is not logged in, the process continues to step 503, in which the viewer is made to log in, and the user ID 160 is similarly identified. Users not registered with the video hosting website 100 are directed to a user registration page (not shown), and the user is registered and issued a user ID 160, then logged in.

Next, in step 504, the tip processing module 201 confirms the tip payment settings of the viewer 141. Viewers 141 who have set their tip payment settings are sent to step 506, and viewers 141 who have not yet set their tip payment settings are sent to step 505, set various means, such as prepaid tip coin payment 604 or credit card/electronic payment 606, for the tip payment settings in the user interface 600 shown in FIG. 6, and are then sent to step 506.

A section for setting an amount for a single tip is present in the upper part of the user interface 600 for tip payment settings, and a section for setting payment method in the lower part. For single-payment tip amounts, the viewer can select and set automatic (601), wherein a fixed amount is paid for each click, and manual (603), wherein the viewer manually sets the payment amount each time. The payment method for each tip can be set in the lower section; viewers can select a prepaid tip coin payment 604 or a credit card or electronic payment 606.

If a prepaid tip coin payment 604 is selected, the viewer must purchase a specific quantity of tip coins in advance using the interface 700 shown in FIG. 7; this process will be described later.

In step 506, the tip processing module 201 confirms the settings of the tip button 400 of the viewer 141. Once the amount per click setting 602 for the automatic tipping setting 601 has been set, the viewer 141 is sent to step 508. If the manual tipping setting 603 is set, the viewer 141 is sent to step 507, inputs the tip amount, and is then sent to step 508.

In step 508, the tip processing module 201 displays a tipping details confirmation screen (not shown) for the viewer 141. Once the viewer 141 has confirmed the tip details and clicked the tip confirmation button (step 509), a tipping complete screen is displayed, and payment of the tip is complete (step 510).

The tip processing module 201 accesses the video database 130, and updates tip information (dates, amounts, etc.) for the video.

If the viewer 141 does not click the tip button 400 in step 501, the tip processing module 201 will not operate. If the content creator 140 has opted not to accept tips (set to No) in the user interface 901, the tip button 400 will not be displayed, and the tipping module 124 will not operate. The tip acceptance settings for the content creator 140 for each video can be confirmed and changed using user interfaces 1600, 1601, even after the videos have been uploaded.

"Steps 504/505" and "steps 506/507" are processed in the order of "steps 504/505" followed by "steps 506/507" in FIG. 5, but may also be processed in the opposite order.

7. Downloading/Saving Videos

Figure 8:
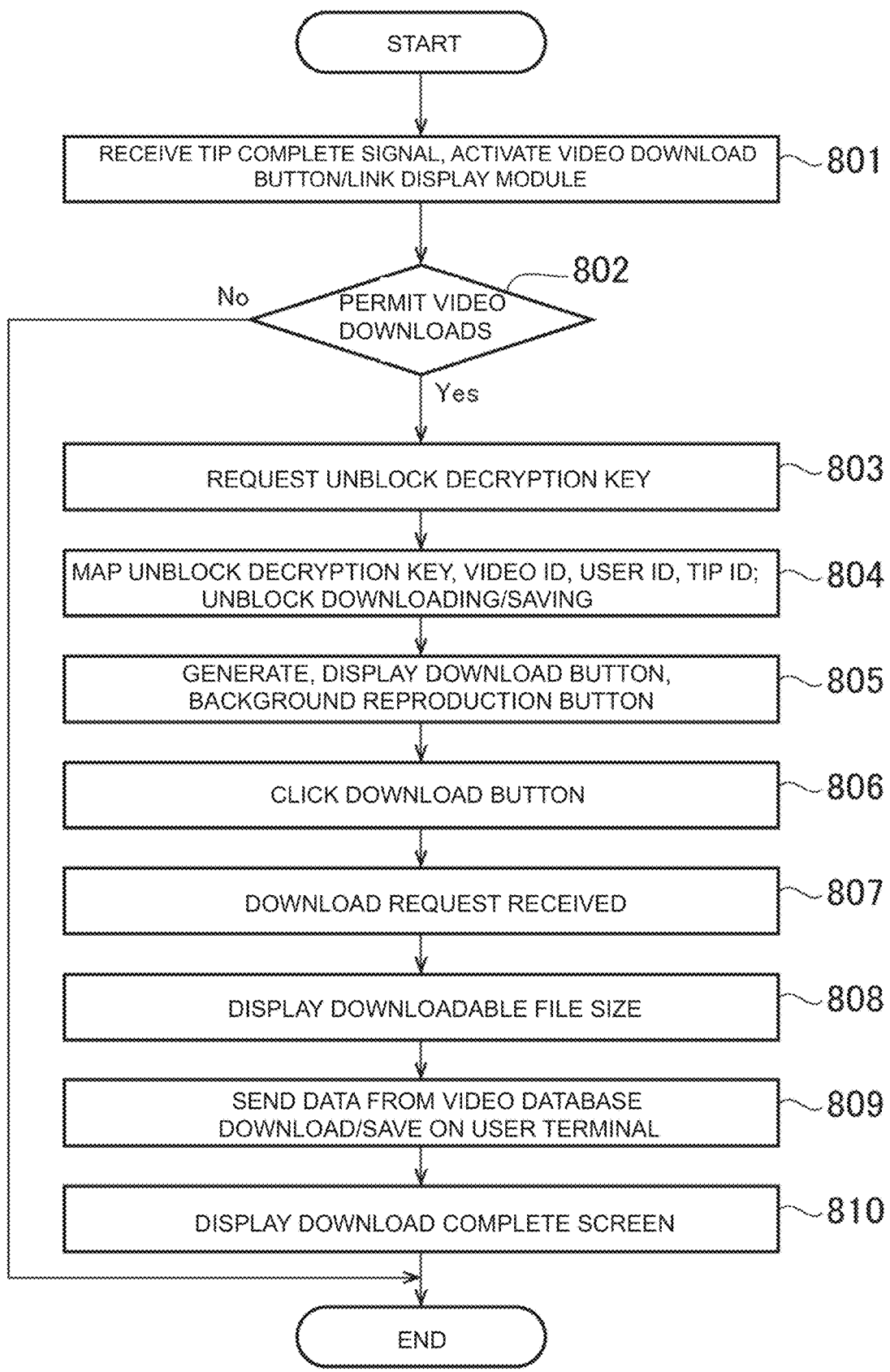
FIG. 8 is a flowchart of a video download process.

FIG. 8 is a flow chart of the operation of the video download button/link display module 202 when a tip is given. When the viewer 141 has finished paying a tip, the video download button/link display module 202 receives a signal from the tip processing module 201 and activates (step 801), and confirms the video download permission setting 902 set by the content creator 140 (step 802). If permission to download the video has been granted, the process proceeds to step 803, the video download button/link display module 202 requests the digital rights management (DRM) module 123 for the decryption key that will unblock downloading and saving the video, and the digital rights management (DRM) module 123 retrieves the decryption key for unblocking downloading and saving of the video from the digital rights management (DRM) database 132, and sends the decryption key to the video download button/link display module 202.

The video download button/link display module 202 maps the decryption key for unblocking downloading and saving, video ID, user ID 160, and tip ID (step 804), unblocks the viewer 141 from downloading and saving the video, generates a download button 1001 and a background playback button (video screen off, audio-only playback) 1003, and displays the buttons on the user interface (step 805).

When the viewer 141 clicks the download button 1001 (step 806), the video download button/link display module 202 receives said request (step 807), confirms the video data in the video database 130, and displays the downloadable file size (step 808).

When the viewer 141 selects the desired video file to download, the video download button/link display module 202 retrieves the designated video file from the video database 130 and sends the file to the viewer 141, and the viewer 141 downloads and saves the file to the terminal (step 809).

When the viewer 141 has finished downloading and saving the file, a download complete screen is displayed (step 810).

By saving the video data in his or her own terminal, the viewer 141 can play the video whenever desired, and can also use the background playback button (video screen off, audio-only playback) 1003 generated by the user interface to play the video in the background.

A "download ready" display 1002 is not displayed on the tip button 400 for videos for which the content creator 140 has indicated No for the video downloading/saving setting (rewards on/off setting) 902, and the video cannot be downloaded and saved even if the viewer 141 offers a tip. After video upload, the content creator 140 can log into a user account page (not shown) and access a user interface 1600 from a Manage Videos button (not shown) to confirm and change tip acceptance settings and downloading/saving permission settings (rewards on/off) for each video in 1601.

The viewer 141, as desired, can also download dedicated application software provided by the video hosting website 100 to view videos. The application software is provided with a dedicated video player, and comprises various functions associated with playing back downloaded and saved videos, such as a dedicated background playback button (video screen off, audio-only playback), a video playlist creation function, etc.

8. Offline Playback

Figure 11:
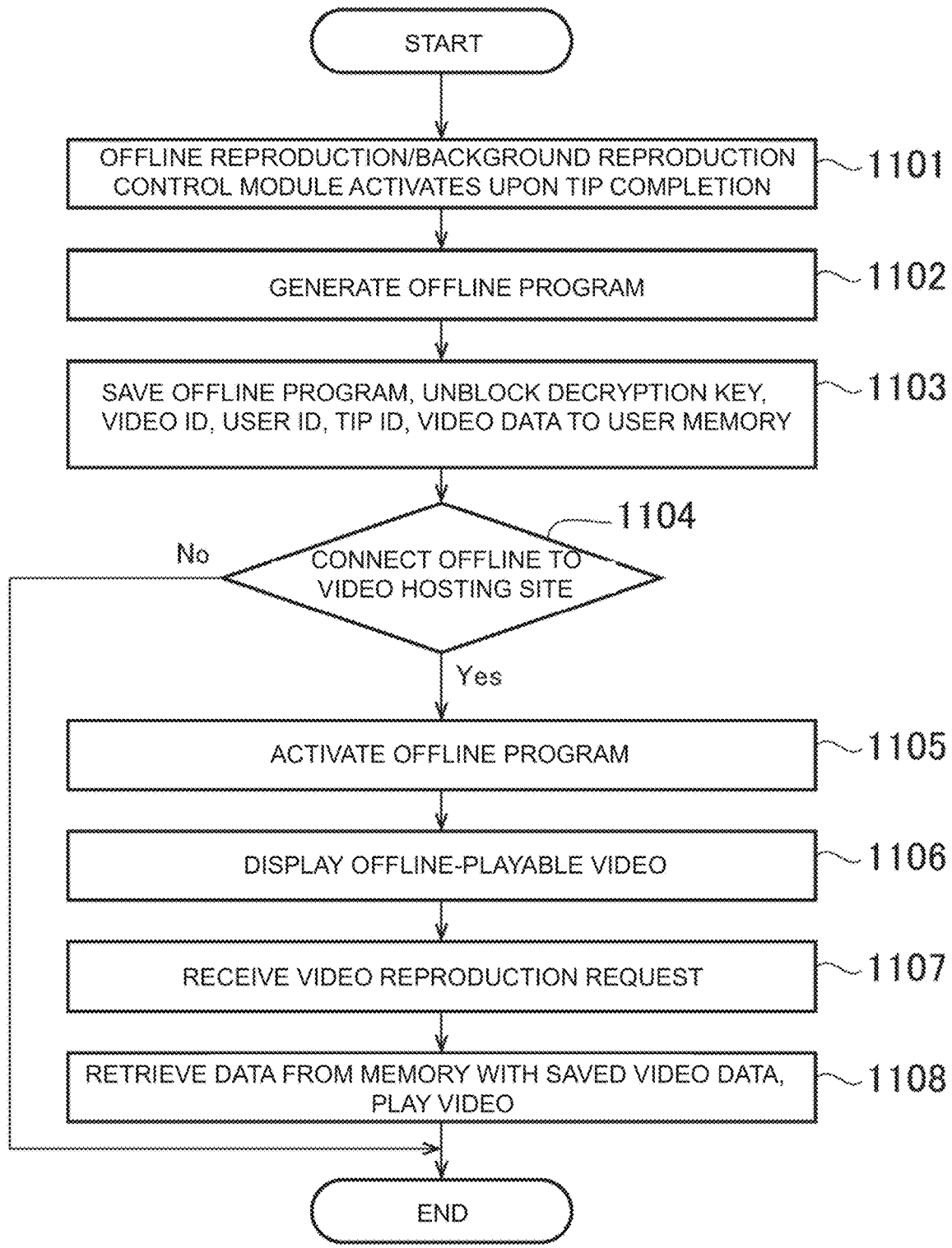
FIG. 11 is a flowchart of a video offline playback setting process.

FIG. 11 is a flow chart for the operation of the offline playback/background playback control module 203 when a tip is given.

When the viewer 141 has finished paying a tip, the offline playback/background playback control module 203 receives a tipping complete signal from the tip processing module 201 and activates (step 1100). Next, the video downloading/saving permission setting (rewards on/off) 902 set by the content creator 140 is confirmed (step 1101). If downloading of the video is permitted (rewards offered), the process proceeds to step 1102, and, if downloading of the video is not permitted (rewards not offered), the offline playback/background playback control module 203 does not activate, and the process ends. Next, the offline playback/background playback control module 203 generates an offline program 180 (step 1102). The offline program 180 generated by the offline playback/background playback control module 203, as well as the download/saving unlocking decryption key, video ID, user ID 160, tip ID, and video data mapped when the tip was paid, are saved to memory (cache, ROM, RAM, etc.) in the user terminal (step 1103). When the user launches the browser 170 offline and attempts to connect to the video hosting website 100 (step 1104), the offline program 180 receives an offline signal from the terminal operation system (not shown) of the viewer 141, and activates (step 1105). Next, in step 1103, the offline program 180 accesses the location in the memory of the terminal of the viewer 141 at which the video data is saved, reads the video data, and displays an offline-playable video in the browser 170 (step 1106). When the viewer 141 selects a playable video, the offline program 180 receives the request (step 1107), retrieves the video data from the memory of the terminal of the viewer 141 in which the video data in saved, and plays the video (step 1108). A background playback button (video screen off, audio-only playback) 1003 is generated in the video player for videos for which tips have been paid, enabling the user to play the videos in the background while working in another browser or application software. In step 1103, the background playback button (video screen off, audio-only playback) 1003 is generated in the video player, enabling the user to play the videos in the background while working in another browser or application software.

The offline program 180 does not activate in online environments. The offline playback/background playback control module 203 does not activate for videos for which the content creator 140 has turned off the video downloading/saving permission setting 902. After uploading videos, the content creator 140 can confirm and change the download/saving permission setting for each video in interfaces 1600, 1601.

Viewings of downloaded videos are counted toward the view count, and stored in the video database 130.

9. Video Rating Based on Tipping Frequency (%)

The video rating generation module 204 is provided with an algorithm for calculating video rating in tandem with tips. The video rating calculation algorithm is based on tipping frequency, calculated according to the following formula.

Tip payment count÷video view count=tipping frequency (%)

An ordinary counting method may be used to determine the tip payment count and the video view count; to calculate a more accurate rating, the unique tip payment count and unique video view count may be determined.

This is because a more accurate video rating can be calculated by counting multiple tips paid by the same user for the same video as only one tip, and counting multiple viewings of the same video by the same user as only one view. As discussed above, the video database 130 and user database 131 save all of a user's video viewing records and tipping records, enabling calculation of the unique tip count and unique view count. As circumstances demand, the operator of the video hosting website 100 calculates the tipping frequency (%) from the unique tip count and the unique video view count.

Figure 12:
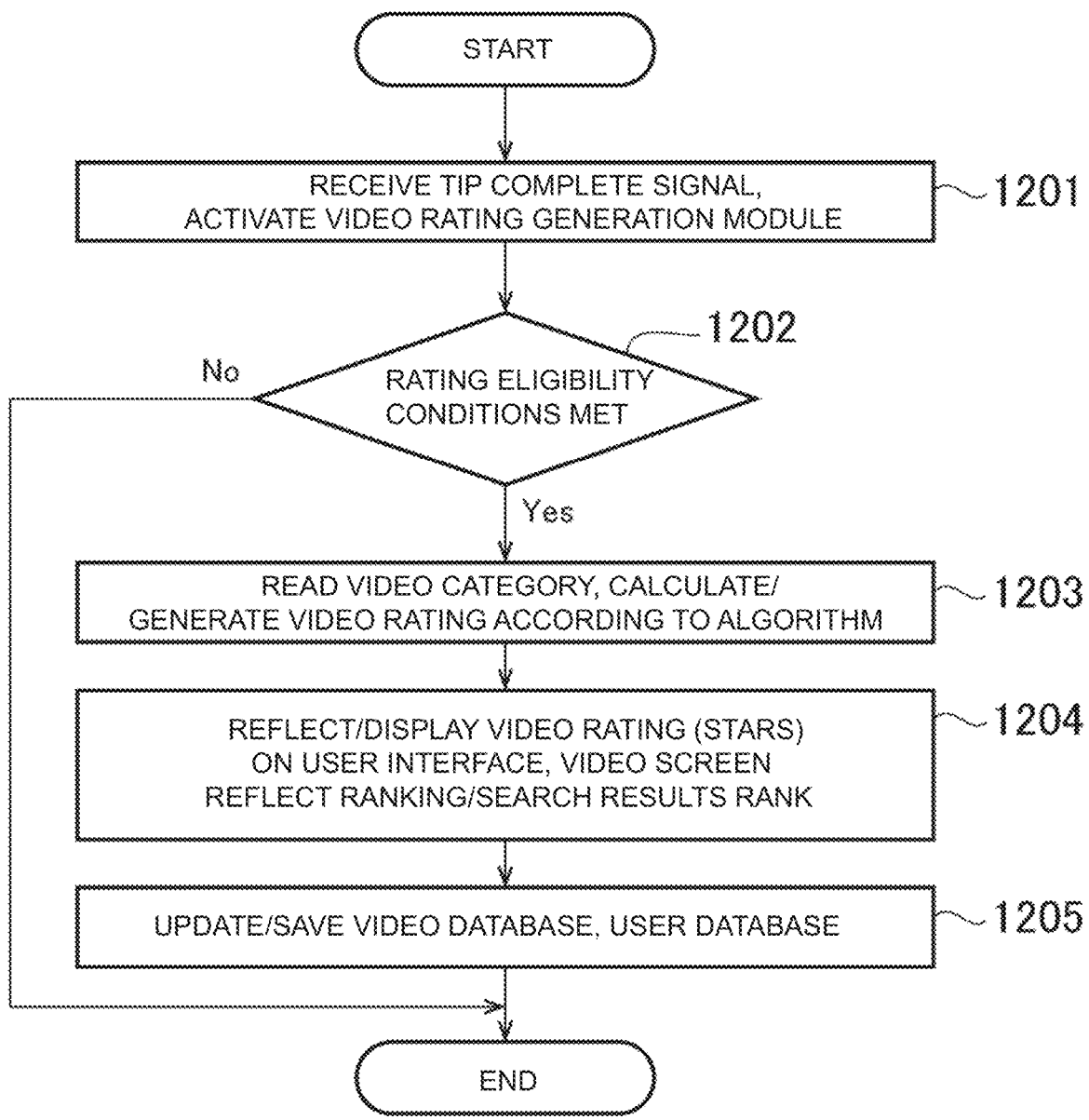
FIG. 12 is a flowchart of a video rating process.
Figure 13:
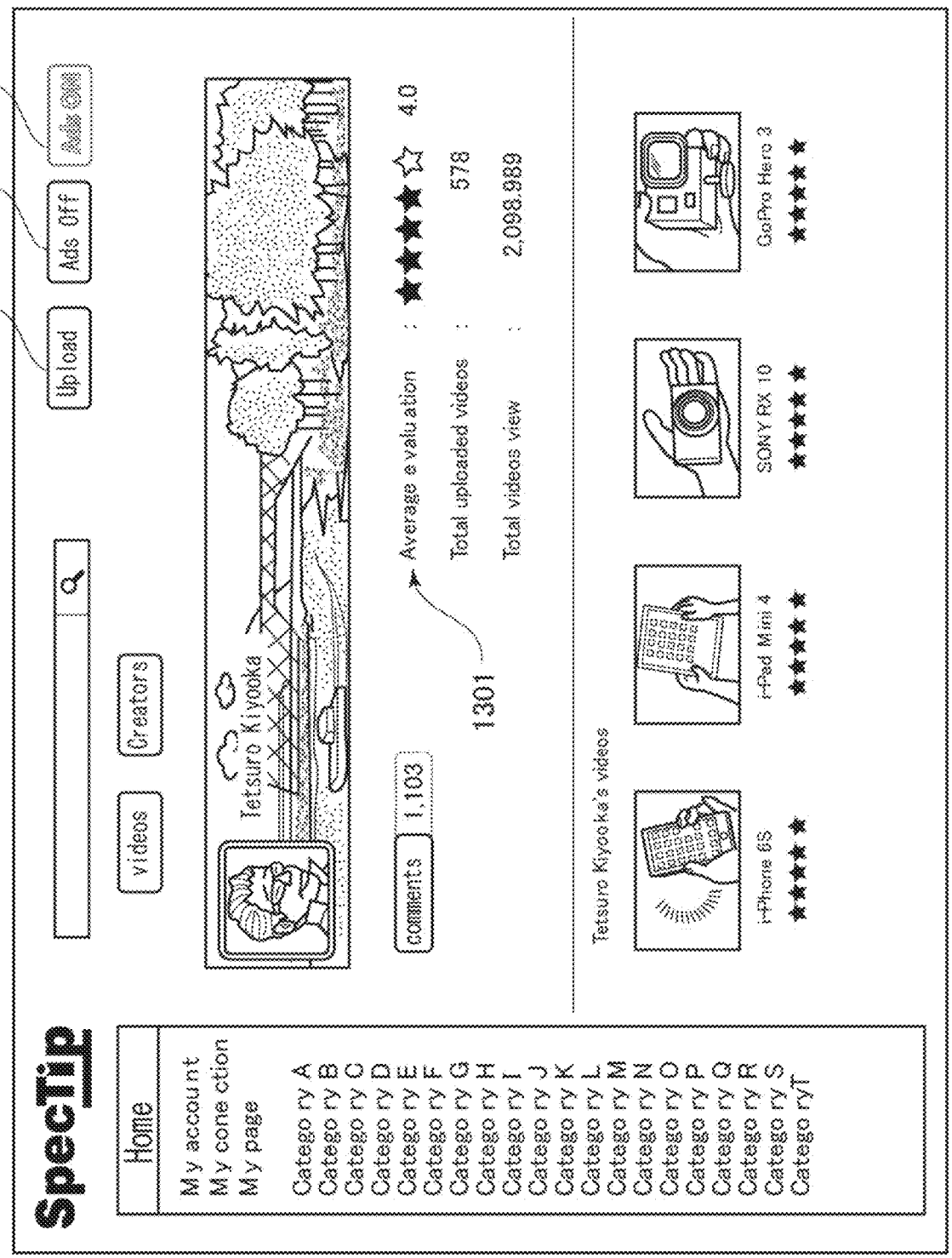
FIG. 13 is a schematic illustration of a video rating screen.

FIG. 12 is a flow chart of the operation of the video rating generation module 204 when a tip is given.

When the viewer 141 has finished paying a tip, the video rating generation module 204 receives a tipping complete signal from the tip processing module 201 and activates (step 1201). The video rating generation module 204 uses a predetermined rating algorithm to confirm rating eligibility conditions (such as minimum view count); thus, the module confirms the video view count with the video database 130, and checks the view count against the set rating eligibility conditions (step 1202). If the conditions are met, the process continues to step 1203; if the conditions are not met, the video rating generation module 204 terminates without rating the video.

In step 1203, the video rating generation module 204 confirms the video category set by the content creator 140 in the user interface 903, and applies the algorithm set for each video category to calculate and generate the video rating. The reason why an algorithm is set for each video category is that video categories (e.g., educational, cars, how-to, music, etc.) have different tipping frequencies, with some categories having high tipping frequencies and some categories having low tipping frequencies. Setting an algorithm for each video category makes it possible to calculate more accurate ratings. The process then proceeds to step 1204, wherein a number (numerical value) and stars reflecting the video rating generated in 1203 are displayed, as indicated by label 401 in the user interface 400 shown in FIG. 4. Simultaneously, the video rating is reflected in the video search results display order, as well as in the video ranking order. The video database 130 and user database 131 pertaining to video rating calculation are then updated and saved (step 1205).

10. Example Tipping Frequency Rating Algorithm (by Rank)

One example of a rating algorithm based on tipping frequency (%) used in the system according to the present invention is to assign high rankings to videos having high tipping frequencies and low rankings to videos having low tipping frequencies, as shown in Table 1 below, and calculate ratings according to rank.

In this case, the tipping frequency rating is expressed in numbers (numerical values) and stars (numbers of stars) on a ten-rank scale of 0.5-5.0 (ten-point method), with the highest rating being 5.0 and the lowest rating being 0.5. An algorithm is set for each video category, and rating eligibility conditions (minimum view count, etc.) are set.

TABLE 1

Example of rating algorithm based on tipping frequency rank

| Rating | Rating (stars) | Rating (number) | Rating according to rank |
|---|---|---|---|
| Not eligible for rating | ☆☆☆☆☆ | 0.0 | Fewer than 100 views, or no tips received |
| Lowest rating | ✶☆☆☆☆ | 0.5 | Lower 5.00% or less |
|  | ★☆☆☆☆ | 1.0 | Lower 10.00% to 5.01% |
|  | ✶✶☆☆☆ | 1.5 | Lower 20.00% to 10.01% |
|  | ★★☆☆☆ | 2.0 | Lower 35.00% to 20.01% |
|  | ✶✶✶☆☆ | 2.5 | Lower 50.00% to 35.01% |
|  | ★★★☆☆ | 3.0 | Upper 49.99% to 35.01% |
|  | ★★★✶☆ | 3.5 | Upper 35.00% to 20.01% |
|  | ★★★★☆ | 4.0 | Upper 20.00% to 10.01% |
|  | ★★★★✶ | 4.5 | Upper 10.00% to 5.015 |
| Highest rating | ★★★★★ | 5.0 | Upper 5.00% or higher |

11. Example Tipping Frequency Rating Algorithm (by Averages)

Another example of a rating algorithm, as shown in Table 2, is based on average tipping frequency (%), with a ten-stage scale (ten-point method) in which the range from highest tipping frequency (%) to average tipping frequency (%) is divided into five stages, and the range from average tipping frequency (%) to lowest tipping frequency (%) is divided into five stages, and a numerical range is calculated for each rating.

In this method, if, for example, the average tipping frequency is 7.50%, the highest value is 30.00%, and the lowest value is 0.10%, the range from (A) the highest value of 30.00% (stars: 5.0) to the average value of 7.50% is divided into five stages, and the range from (B) the lowest value of 0.10% (stars: 0.5) to the average value of 7.50% is divided into five stages. As a result, a numerical range for each rating is calculated as follows.

30.00% (max. value)–7.50% (average value)=22.50%÷5 (stages)=4.50% (numerical range) (A)

7.50% (average value)–0.10% (min. value)=7.40%÷5 (stages)=1.48% (numerical range) (B)

It is also possible to set an algorithm for each video category, and to set rating eligibility conditions (minimum view count, etc.).

The rating thus calculated is expressed with stars and number of stars, as indicated by label 401 in the interface in FIG. 4.

TABLE 2

Example of algorithm based on average tipping frequency

| Rating Value | Rating (stars) | Rating (number) | Tipping frequency (%) | Numerical range (%) |
|---|---|---|---|---|
| Not eligible for rating | ☆☆☆☆☆ | 0.0 | Fewer than 100 views, or no tips received |  |
| Minimum value | ✶☆☆☆☆ | 0.5 | 0.10% or less to 1.58% | 1.48% 1.48% |
|  | ★☆☆☆☆ | 1.0 | 1.59% to 3.06% |  |
|  | ✶✶☆☆☆ | 1.5 | 3.07% to 4.54% | 1.48% |
|  | ★★☆☆☆ | 2.0 | 4.55% to 6.02% | 1.48% |
|  | ✶✶✶☆☆ | 2.5 | 6.03% to 7.50% | 1.48% |
|  | ★★★☆☆ | 3.0 | 7.51% to 12.00% | 4.50% |
|  | ★★★✶☆ | 3.5 | 12.01% to 16.50% | 4.50% |
|  | ★★★★☆ | 4.0 | 16.51% to 21.00% | 4.50% |
|  | ★★★★✶ | 4.5 | 21.01% to 25.50% | 4.50% |
| Highest rating | ★★★★★ | 5.0 | 25.51% to 30.00% or greater | 4.50% |

12. Rating Algorithm Based on Total Received Tips

In the system according to the present invention, it is also possible to set an algorithm based on total received tips for the video in the video rating generation module 204. This is because videos that have high total received tips can be defined as highly rated. However, this method has the drawback that videos that have been posted for longer periods will inevitably have higher total received tips, and statement periods (1 hour, 3 hours, 24 hours, weekly, monthly, annual, etc.) are set, and total received tips for each video are calculated. In addition, because tip amounts for the same video will differ from user to user due to the personal circumstances (income, etc.) of users, this approach will inevitably be less reliable than the tipping-frequency-based algorithm described above. For this reason, while this total-received-tips-based algorithm can be used alone, it is better to construct an algorithm in combination with the tipping-frequency-based algorithm.

The calculation method (rating according to rank) described in Table 1 can be applied to this total-received-tips-based algorithm, with videos being ranked according to total received tips, and ratings being calculated according to a ten-stage scale (ten-point method) and expressed in numbers (numerical values) and stars (numbers of stars). The calculation method described in Table 2 (rating based on average values) can similarly be applied, with the algorithm being based on average total received tips, the range from the highest total received tips to the average total received tips being divided into five stages, the range from the average total received tips to the lowest total received tips being divided into five stages, a numerical range being calculated for each rating, and ratings being expressed on a ten-stage scale (ten-point method). An algorithm is set for each video category, and rating eligibility conditions (minimum view count, etc.) are set.

13. Average of Multiple Ratings Algorithm

In the system according to the present invention, it is also possible to calculate a rating from the average of the rating calculated from tipping frequency as described in sections 10 and 11 above and the rating calculated from total received tips as described in section 12 above. For example, a tipping frequency rating of 4.5 and a total received tips rating of 4.0 yields the following value.

(4.5+4.0)÷2 (number of algorithms)=4.25 (average rating)

This rating is not expressed on a ten-stage scale, but as a numerical value (to two decimal places), and stars in combination with the numerical value. While the average rating is calculated from two algorithms in this example, more than two algorithms may also be used.

The video rating calculation algorithms described above and in the previous sections are merely examples; various video rating algorithms based on the tipping frequency or tip revenues obtained from user tips can be set in the video rating generation module 204. While the video ratings are expressed on a ten-stage scale (ten-point method) in the examples above, they can also be expressed, for example, via a 100-point method (maximum 100 to minimum 1).

Apart from numbers (numerical values) and stars, ratings can be displayed in the user interface using other rating display methods capable of expressing numerical rating values, such as bar graphs.

As AI (artificial intelligence) technology advances in the future, it will also be possible to provide more accurate video ratings to users by setting an algorithm combining tipping frequency, tips revenues, and AI in the video rating generation module 204.

14. Rating Content Creators Based on Tips

The video rating generation module 204 associates all video ratings pertaining to tips with video ID and user ID 160, and saves them in the video database 130 and the user database 131. The video rating generation module 204 calculates the average rating for all videos uploaded by a content creator 140, and displays this average rating on a user interface 1301 constituting a personal page for the content creator 140.

The average video ratings for content creators 140 are also reflected in the display order of search results yielded by a content creator search system for searching content creators 140. As a result, a user can confirm the rating of a content creator 140 in a timely manner.

15. Tip-Associated Video Ranking Display

On the video hosting website 100, video rankings are posted on the user interface on the basis of the ratings based on tipping frequency and total received tips described above. Content creator 140 rankings are similarly posted.

Ranking periods (1 hour, 3 hours, 24 hours, weekly, monthly, annual, etc.) are established, and highly ranked videos and content creators 140 are listed at the top of the ranking screen, thereby providing users with a timely display of popular videos and popular content creators.

16. Accepting Tips

After a user has given a tip, the tip revenue module 205 calculates and generates tip revenue shares as decided upon by the content creator 140 and the operator of the video hosting website 100, and the user database 131 for the content creator 140, and the associated video database 130, are updated and saved.

For example, revenue shares of 60% for the content creator 140 and 40% for the operator of the video hosting website 100 are agreed upon, and, when a viewer 141 gives a tip of $1.00, the content creator 140 receives $0.60 and the operator of the video hosting website 100 receives $0.40. Once a tip payment is confirmed, the tip revenue module 205 distributes the tip revenue according to conditions (revenue shares, payment conditions, bank account for depositing tips, etc.) agreed upon with the content creator 140.

The tip revenue module 205 receives and displays information on tip revenue details (numbers of transactions, times/dates, currencies, amounts, revenue shares, revenue amounts, tip payment dates, tip givers) for all videos uploaded by a user to the user interfaces 1400, 1401, and the details (numbers of transactions, times/dates, currencies, amounts, payment IDs) for tips given by users for various videos on the user interfaces 1500, 1501, from the video database 130 and the user database 131.

If the content creator 140 has opted no for the tip acceptance setting 901 for the uploaded video, the system according to the present invention does not display the tip button 400 on the video screen, making it impossible to receive tips for the video. After video upload, the content creator 140 can log into a user account page (not shown) and access a user interface 1600 from a Manage Videos button (not shown) to confirm and change tip acceptance settings and downloading/saving permission settings (rewards on/off) for each video in 1601.

17. Buying and Selling Prepaid Tip Coins

In the video hosting website 100 of the present invention, prepaid tip coins are sold through the user interface 700, and are available for purchase by users.

In this example, the tip revenue module 205 establishes and displays an exchange rate for currency and tip coins (701). Thus, if, for example, it has been established that USD 1.00=1.00 TipCoin, a user can use 1.00 TipCoins to give a tip of USD 1.00. The tip revenue module 205 is configured so that rewards can be included with prepaid tip coins, and is configured so as to be capable of displaying explanations of rewards 702, and awarding reward points as follows, for example.

Prepaid USD 10.00=0.10 TipCoins (Reward*0.10 TipCoins)
Prepaid USD 25.00=25.30 TipCoins (Reward*0.30 TipCoins)
Prepaid USD 50.00=51.00 TipCoins (Reward*1.00 TipCoins)
Prepaid USD 100.00=103.00 TipCoins (Reward*3.00 TipCoins)

The monetary amount of rewards may be borne by the operator of the video hosting website 100, in which case the user purchasing the prepaid tip coins profits by indirectly receiving monetary rewards. The operator can also alter and set reward points at any time in the tip revenue module 205.

The tip revenue module 205 is also configured so as to enable users to confirm prepaid tip coin conditions 701 and reward conditions 702 when purchasing tip coins. After confirming these conditions, the user selects the purchase amount 703, selects the payment method 704, inputs the information required to carry out the payment, and clicks an order button 705 to purchase prepaid tip coins.

When using a credit card or electronic payment to give a tip, the user must transmit payment information, which is confidential user information, over the Internet every time such a payment is made. However, purchasing prepaid tip coins and using the coins to give tips reduces the number of times confidential user information is transmitted over the Internet, thereby reducing the risk of confidential information being hacked. Naturally, this exchange of confidential information is encrypted, and thus would be of no use to a hacker even if it were hacked. However, as the transmission of confidential information over the Internet is not completely without risk, having users purchase prepaid tip coins reduces the number of times confidential user information is transmitted over the Internet, resulting in increased security.

While the term "prepaid tip coin" is used herein, other names that make it clear that users can give tips, such as "prepaid tip points" or "prepaid tip cash", may also be used.

While the service is explicitly described in places in the foregoing description only as being for a content creator 140 and a video viewer 141 for the sake of clarity, the service can be provided to all users that have a user ID 160.

18. Download Reward Settings

Next, the control of the user interface provided to the content creator in "4. Uploading videos" above will be described.

The present invention is provided with the video provision options control module 126, which operates so that the tip acceptance setting 901, download permission (reward) setting 902, and accepted tip count display 904 operate in tandem in the user interface shown in FIG. 9.

Specifically, the video provision options control module 126 displays the download reward selection 902 and tip count display selection 904 only when the tip acceptance selection 901 has been set to allow (Yes/offer), and the download reward selection 902 and tip count display selection 904 are not active, and cannot be selected or designated, when the tip acceptance selection 901 has been set to not allow (No/do not offer).

Specifically, because the acceptance of ad revenues is a means of receiving remuneration that conflicts with tip payments, the video provision options control module 126 sets the ad revenue acceptance selection 905 to No, and makes it inactive so as not to be selectable, when the content creator has selected to permit (Yes) for the tip acceptance selection 901. As a result, no ads (of any sort, including in-stream ads) are displayed for the video. In other words, the video provision options control module 126 of the present invention is configured to operate either the tip acceptance selection 901 or the ad revenue selection 905 on the basis of the setting (Yes or No) for the tip payment selection 901.

As described above, the video provision options control module 126 is configured so that the user selects, on the user interface 902, whether to permit downloading of a video to a user terminal as a reward (rewards on/offered) or not permit downloading (rewards off/not offered) only for videos for which the content creator 140 has permitted tipping.

Figure 17:
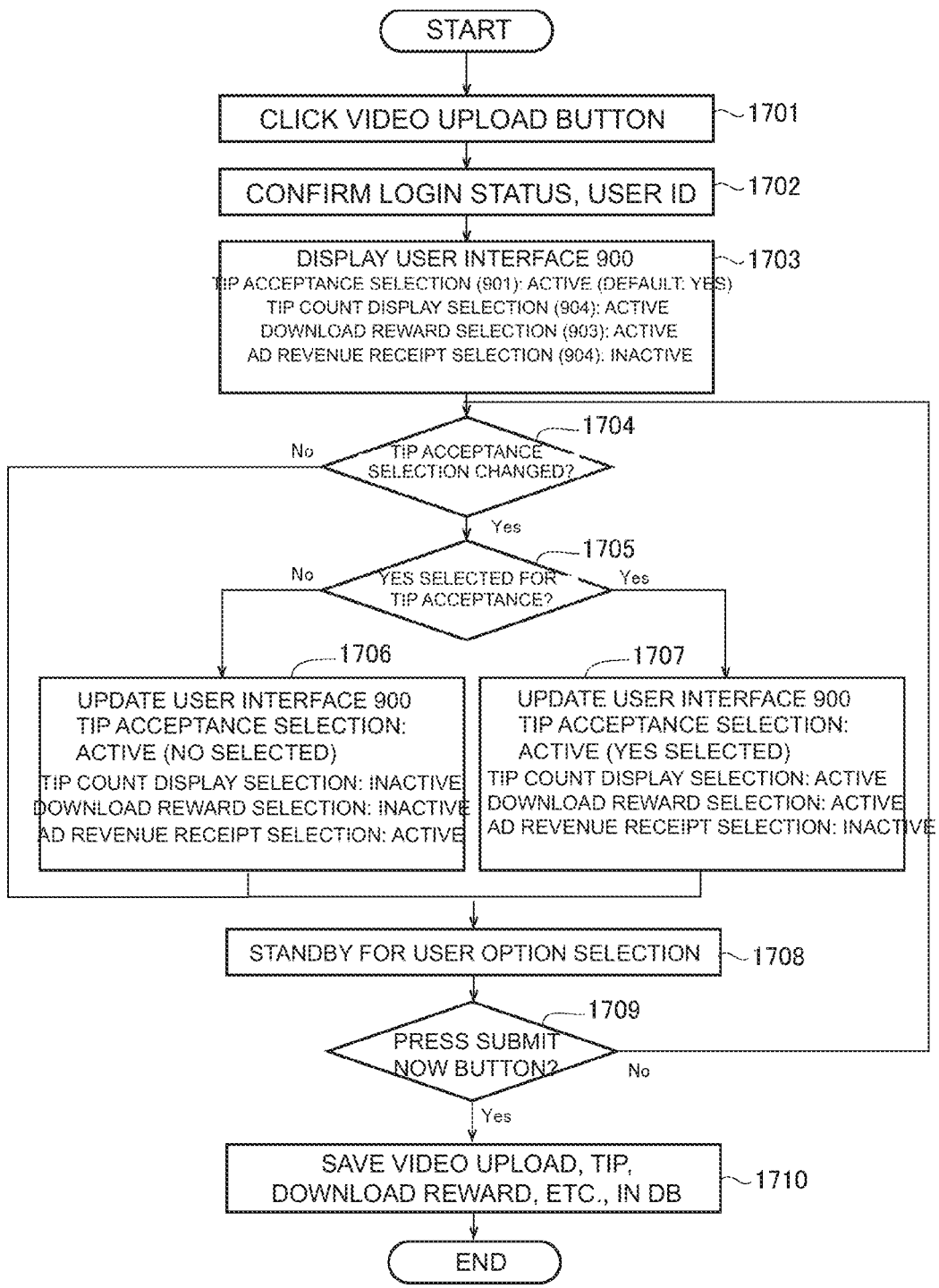
FIG. 17 is a flowchart of a selection process for options pertaining to video provision.

The operation of the video provision options control module 126 described above will now be described in greater detail with reference to the flowchart in FIG. 17.

First, when the content creator 140 clicks, for example, the "Upload" button 402 in the user interface shown in FIG. 4 in step 1701, the video provision options control module 126 confirms whether the content creator 140 is already logged in (1702), has the content creator log in if not logged in, and displays a specific user interface 900 (FIG. 9) on the basis of the ID of the user (step 1703). Although the process is not shown in the drawings, if the user is not registered with the video hosting website 100, the user is directed to a user registration page (not shown), is registered, and acquires a user ID 160, which is identified when logging in (1703).

Out of a plurality of options 901, 902, 904, 905 selectable by the content creator in the default user interface 900 display, the video provision options control module 126 sets the tip acceptance option 901, tip count selection 904, and download reward selection 902 to active, and sets the ad revenue acceptance selection 905 to No and renders the selection inactive so that it cannot be selected (step 1703).

In the present embodiment, Yes has been selected for all of the active options 901, 904, 902.

Next, if the content creator changes the tip acceptance selection 901 to No, this is detected in steps 1704, 1705, and the display of the user interface 900 is updated (step 1706). Specifically, in such cases, the tip count selection 904 and the download reward selection 902 are set to inactive, and, in their place, the ad revenue acceptance selection 905 is set to active so as to be selectable (step 1703). As described above, No is selected for the ad revenue selection 905 by default.

If the content creator changes the tip acceptance selection 901 to No, then back to Yes, this is detected in steps 1104, 1105, and the display of the user interface 900 is updated, as shown in step 1707. Specifically, in such cases, the tip acceptance selection 901, tip count selection 904, and download reward selection 902 are set to active, and the ad revenue acceptance selection 905 is set to No, and rendered inactive so as to be unselectable.

Next, the video provision options control module 126 waits for the user to make selections for the various options (step 1708), and, when the Submit Now button is pressed (step 1709), the video file is uploaded and saved in the video database 130 along with the option settings selected by the user (step 1710).

In this arrangement, when the tip acceptance selection 901 is set to Yes, the download reward selection 902 is made active, allowing the user to select whether to permit (offer a reward) or not permit (not offer a reward) downloading and saving of the video when a tip is given for the video (steps 1703, 1707).

Figure 10:
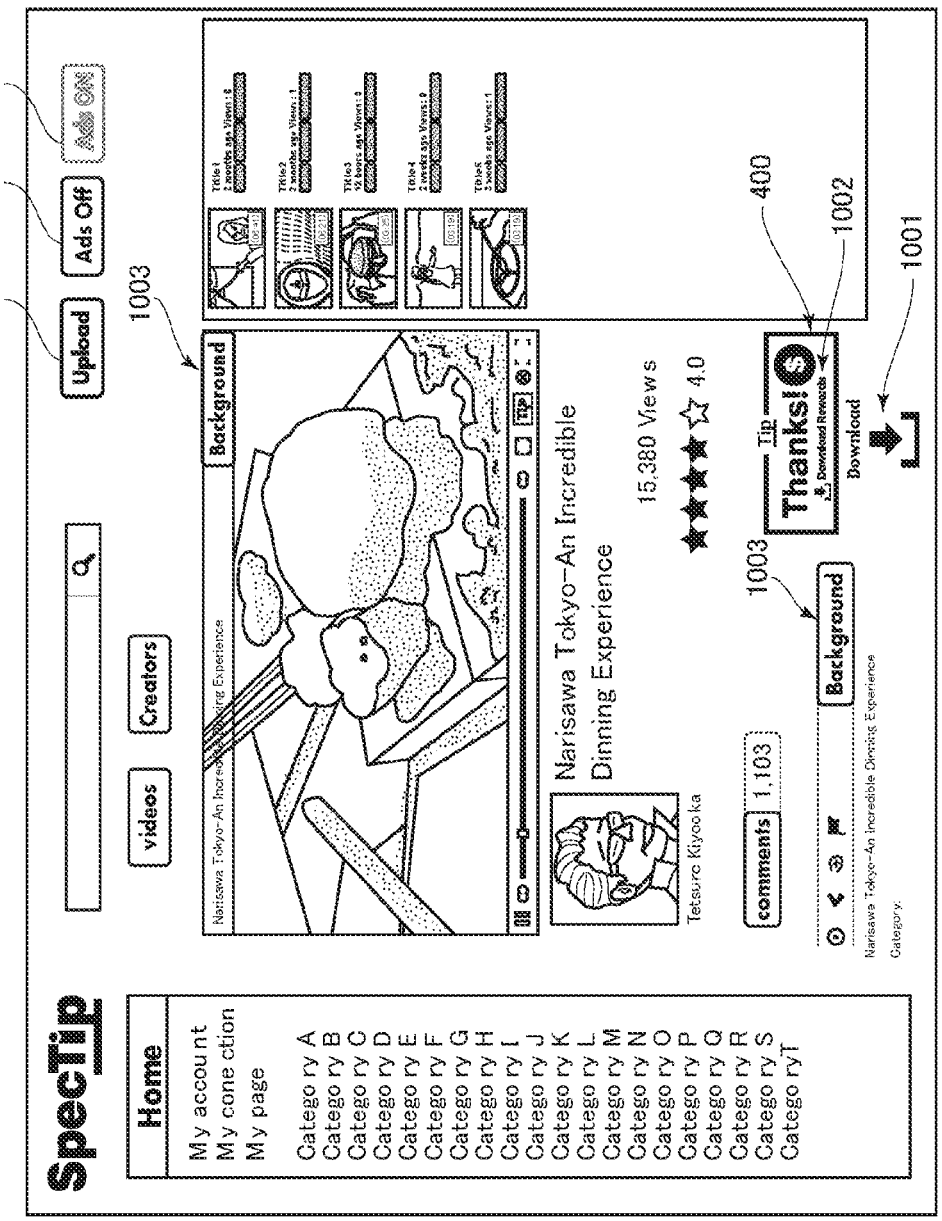
FIG. 10 is a schematic illustration of a screen after a tip payment.

If video downloading/saving is permitted (a reward is offered) in these steps, a tip button 400 for the video is generated on the user interface shown in FIG. 10, as described above, and a download reward display 1002 is also displayed. As a result, the viewer 141 can confirm that the video offers a download reward. Next, when the viewer 141 gives a tip for the video, the video download button/link display module 202 and offline playback/background playback control module 203 activate, enabling downloading and saving, offline playback, and background playback of the video on a terminal of the viewer 141, as described above.

If, in steps 1704, 1705, it is detected that the content creator 140 has not opted to accept tips for the video, and said setting has been saved (step 1710), a tip button 400 is not generated for the video, the tip button 400 is not displayed on the user interface, and tips cannot be accepted, as described above.

If the content creator 140 uses the interface 900 to set the download reward selection 902 to No (no reward offered) for a video for which a tip is given, the download reward display 1002 is not displayed on the tip button 400 for the video on the user interface shown in FIG. 10, and the viewer 141 is capable of confirming that a download reward is not offered for the video. In such cases, the video download button/link display module 202 and offline playback/background playback control module 203 do not activate even if a viewer 141 gives a tip for the video, and the video cannot be downloaded and saved, played offline, or played in the background on the terminal of the viewer 141.

Figure 16:
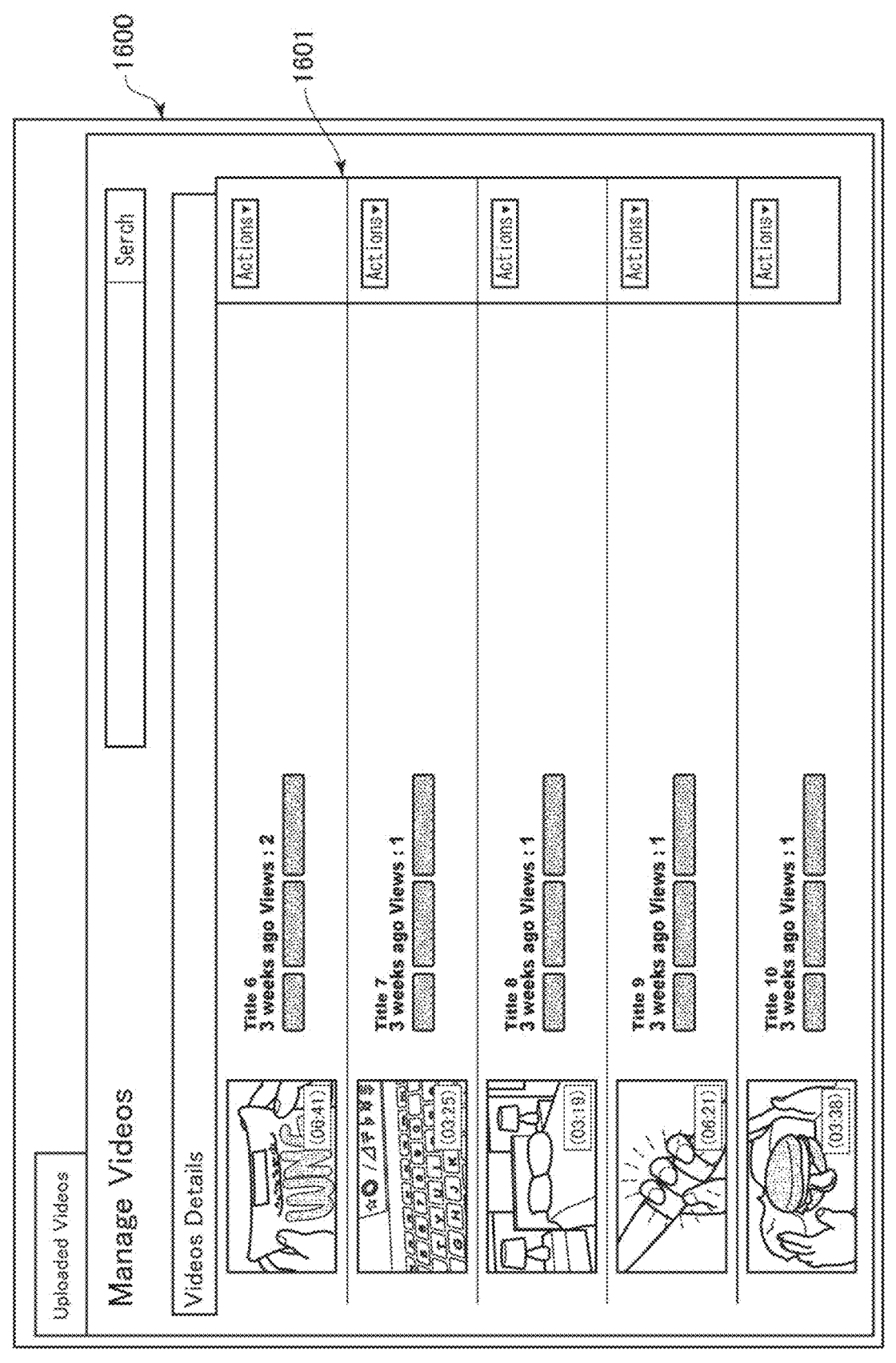

After video upload, the content creator 140 can log into and access a user account page (not shown) and access the user interface 1600 shown in FIG. 16 from a Manage Videos button (not shown) to confirm and change tip acceptance settings and downloading/saving permission settings (rewards) for each video in 1601.

As concerns the download reward display 1002, a display method other than the download reward display 1002 displayed on the tip button 400 as described above, or a method other than one in which, after a tip payment is confirmed, a download button 1001 and a background playback button 1003 are generated and displayed on the user interface, may be used as long as the viewer 141 is capable of confirming whether or not download rewards are offered for each video, and the video download button/link display module 202 and the offline playback/background playback control module 203 operate in tandem.

For example, if the video download permission setting 902 in FIG. 9 is set to permit (offer a reward), a download button 1001A and a background playback button 1003A such as shown in FIG. 19A-C may be displayed.

In addition, an arrangement is acceptable in which, after the viewer 141 has given a tip for the video using the tip button 400, the video download button/link display module 202 and the offline playback/background playback control module 203 activate, and the display of the download button 1001A is altered to 1001B, as shown in FIG. 19B, and the display of the background button 1003A is altered to 1003B, as shown in FIG. 19C, to show that the buttons are active. The download buttons may also be displayed in forms such as shown in FIG. 19D (icons only).

If the video download permission setting 902 is set to not permitted (no reward offered), the download button 1001A and background playback button 1003A are not displayed, and the video download button/link display module 202 and offline playback/background playback control module 203 do not activate. After video upload, the content creator 140 can log into a user account page (not shown) and access a user interface 1600 from a Manage Videos button (not shown) to confirm and change tip acceptance settings and downloading/saving permission settings (rewards) for each video in 1601.

The present invention is not limited to the example described above, and various modifications may be made thereto to the extent that they do not depart from the gist of the invention.

For example, for the tip payment means, apart from setting the tip button 400 as described in the foregoing embodiment, the operator of the video site 100 can also alter the user interface 600 so that default settings for the tip button 400 are set in advance. The default settings for the tip button 400 are amount per click (including currency) and payment method (prepaid tip, credit card, electronic currency, etc.), and the operator of the video site 100 can alter the user interface 600 to set defaults for the tip button 400.

Figure 18:
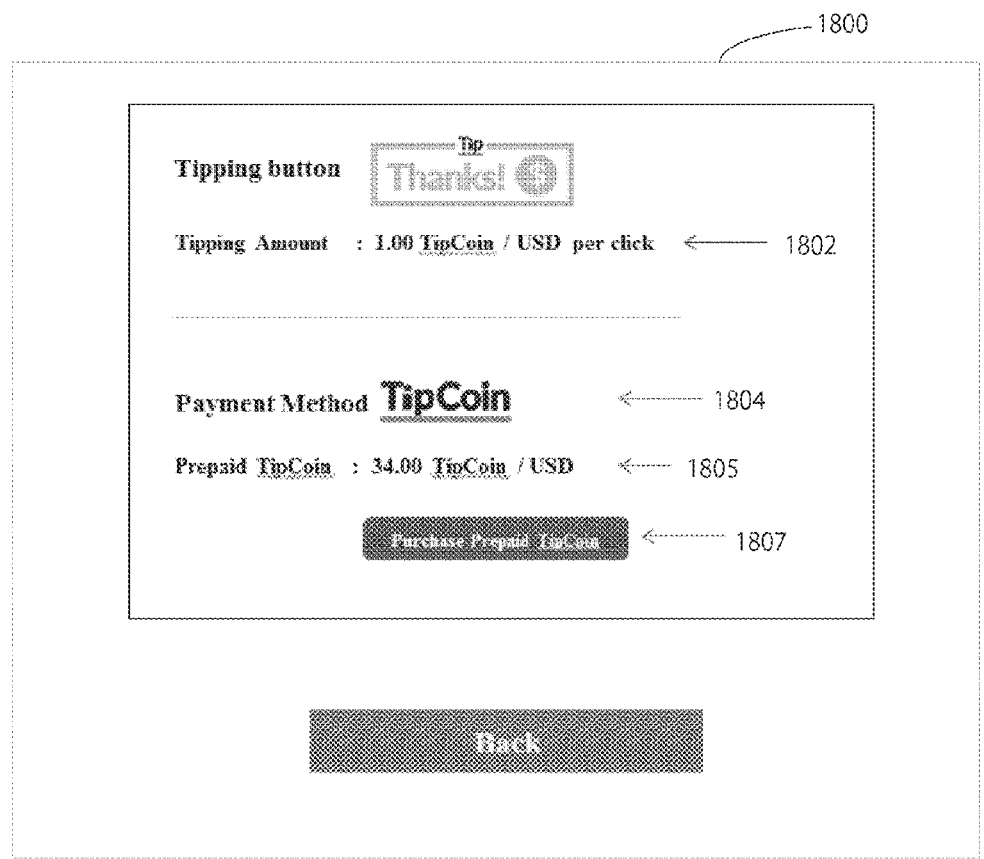
FIG. 18 is a schematic illustration of a tip setting screen.

For example, to set defaults of 1 USD per click and prepaid tips as the payment method, the interface 1800 shown in FIG. 18 is provided instead of the user interface 600 shown in FIG. 6, the amount and currency per click of the tip button (1802) are displayed, and only the default tip payment method 1804 is displayed.

In order to set these defaults, the content viewer 141 can, as necessary, access the user interface for tip button settings, and confirm the default settings for the tip button 400.

In the interface shown in FIG. 18, label 1807 indicates a button for accessing the prepaid tip coin purchasing interface (returning to FIG. 7). A similar button may also be provided in the interface shown in FIG. 6.

19. Reward Definitions

The definition of a reward (premium) is that it is possible, depending on the options settings set by the content creator, to decline to offer a video download reward even if a viewer gives a tip using the tipping button 400. By virtue of this function, the video download reward can be defined as a reward (premium) rather than products or services for sale. In other words, a reward is something that money cannot buy.

The above described embodiment only shows video downloading as rewards; however the rewards are not limited to videos according to the definition but may be audios extracted from videos, or other rewards (extra rewards) may be offered in addition to videos and audios.

The following section explains an example in which audio rewards and other rewards (extra rewards) are offered in addition to video rewards.

20. System/Server Configuraton

Figure 20:
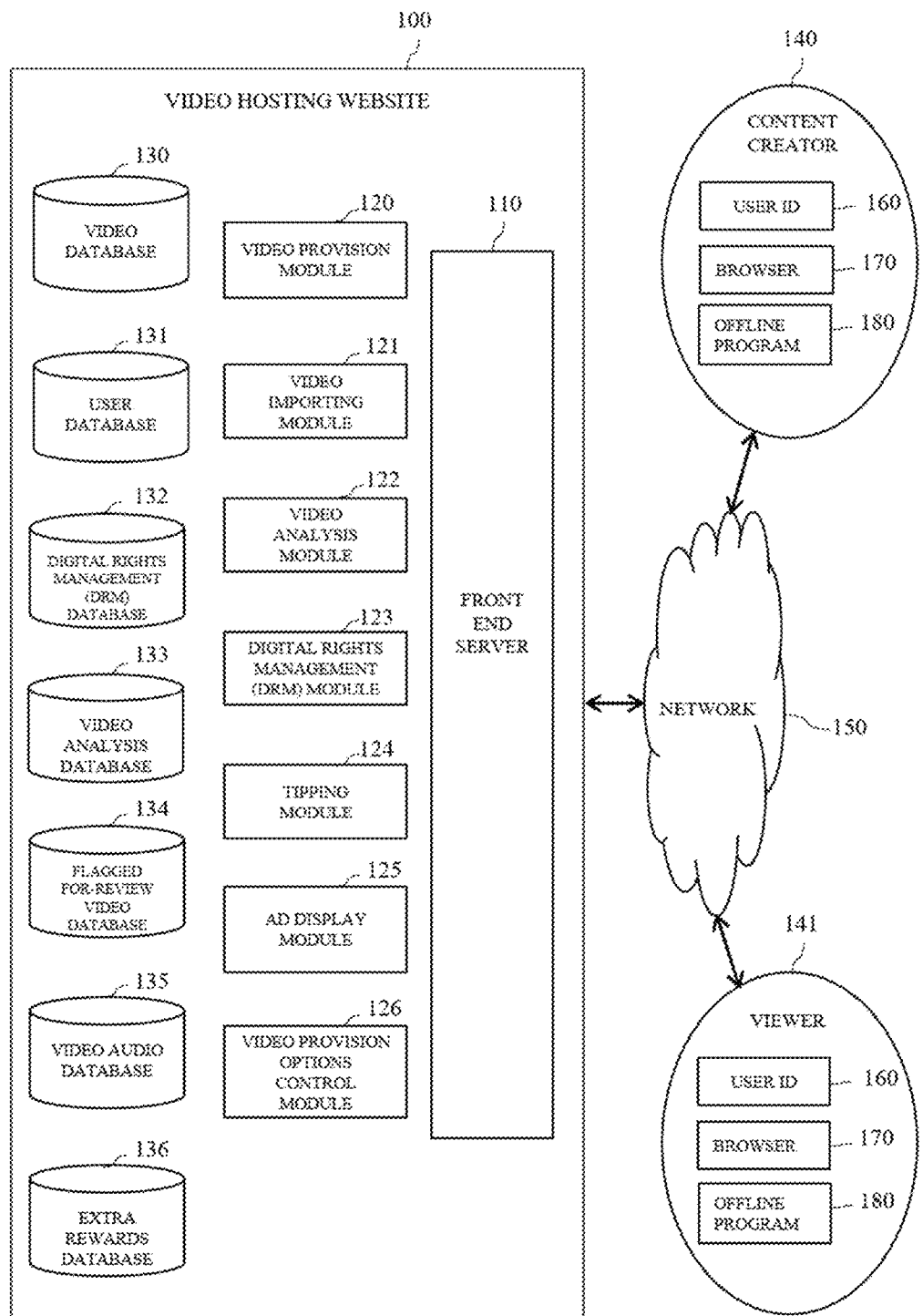
FIG. 20 is a schematic illustration of the system configuration of a video hosting server according to another example of the present invention.

FIG. 20 shows a system configuration of another embodiment of the present invention. In this embodiment, in addition to the elements shown in FIG. 1, the system comprises various databases including a video audio database 135 and an extra rewards database 136.

In this example, the records of registered users includes names, user names, channel names, passwords, email addresses, tip payment information (credit card numbers, online payment information, etc.), tipping settings, tip receipt information (bank account, etc.), tipping records, tip receipt records, video viewing records, video upload records, video upload settings, rewards settings, extra rewards settings, author records, violation records, and ad settings information (whether or not the user wishes to receive ad revenue for uploaded videos, and settings for doing so).

Records are also included for users who simply watch videos without being registered on the video hosting website 100.

In the other embodiment, users not registered with the video hosting website 100 can view videos, but must register with the video hosting website 100 and obtain a user ID 160 in order to utilize services such as paying tips, receiving tips, uploading videos, downloading videos (rewards), downloading video audio (rewards), uploading extra reward data, receiving extra rewards, rating videos, and posting comments; thus, the operator of the video hosting website 100, through the user interface (not shown) on the front end server 110, notifies unregistered users of the option of registering with the site, and encourages them to do so.

In the user interface 920 in the user interface 900 shown in FIG. 26, as will be discussed in detail hereinafter, the video data to upload can be designated by selecting the storage location of the video or dragging and dropping the file, and video title, description, tags, and category can be designated.

One can also select and designate whether to accept tips for a video (tip acceptance option 901), whether to display the number of received tips (tip count display option 904), whether to permit downloading of the video by (offer a reward to) tipping users (video download reward option 902), whether to permit downloading of the audio of the video by (offer a reward to) tipping users (video audio download reward option 906), whether to accept paid ads (ad revenue option 905), whether to offer an extra reward to tipping users (extra reward option 907).

When a Submit Now button 918 in the interface is clicked, the video importing module 121 uploads the video data designated in 920 described above and stores the data in the video database 130, and the records in the user database 131 are updated and saved.

The options settings designated using the user interface 900 (FIG. 26) cause the associated modules to operate; these option settings and operation will be described in detail hereinafter.

21. Tipping Module

Figure 21:
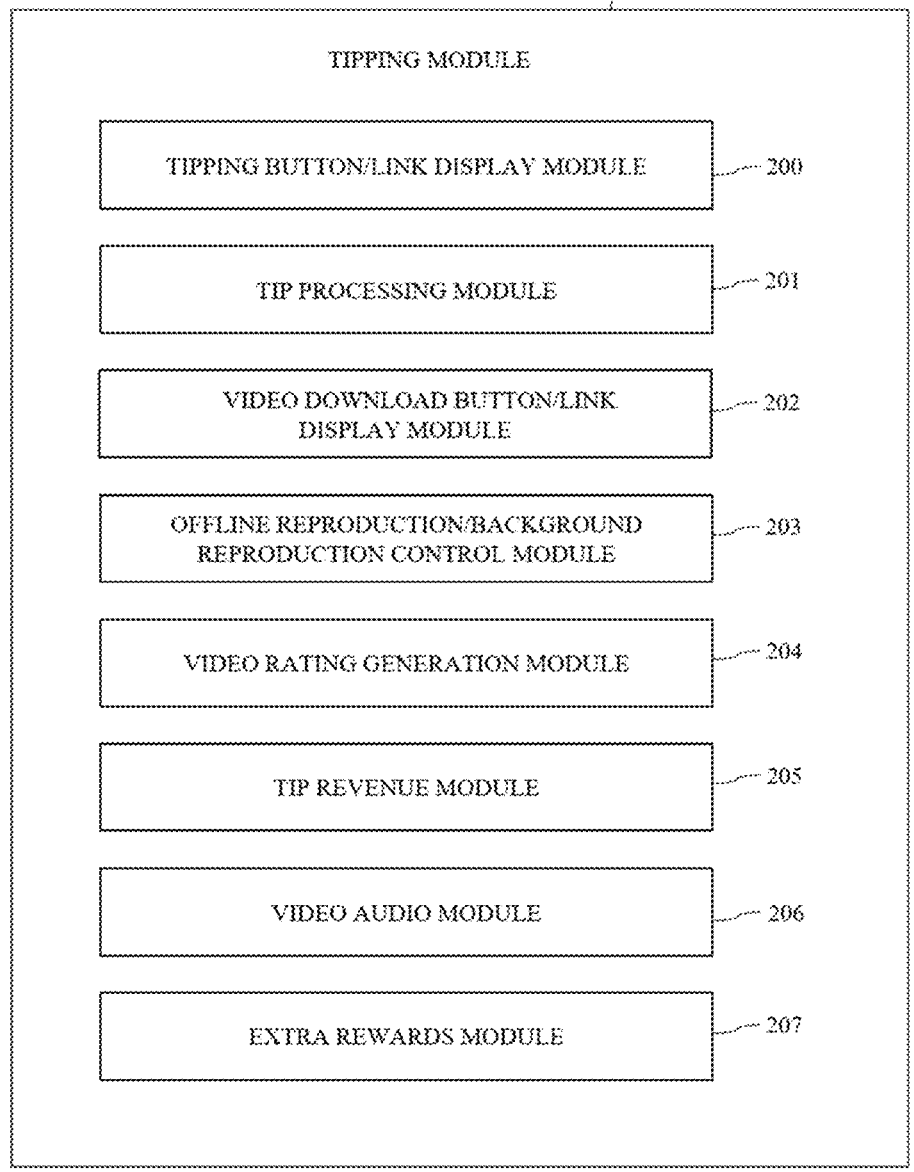
FIG. 21 is a schematic illustration of a tipping module of the same.

FIG. 21 is a block diagram of the tipping module 124 shown in FIG. 20.

In the embodiment shown in FIG. 21, the tipping module 124 comprises a video audio module 206 and an extra reward module 207.

Figure 22:
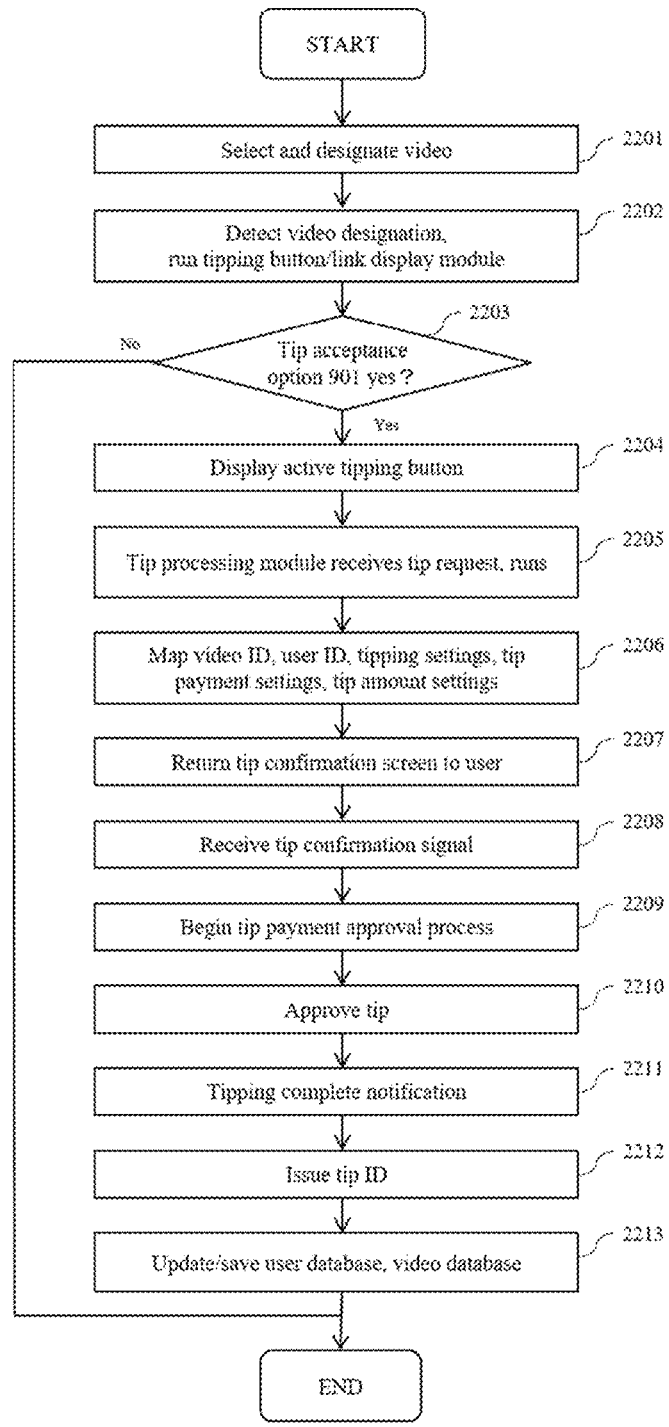
FIG. 22 is a flowchart of a video playback process in the same.

FIG. 22 is a flowchart of a process performed by the tipping module 124, which works together with the video selection/designation operation performed by the viewer terminal 141.

Figure 23:
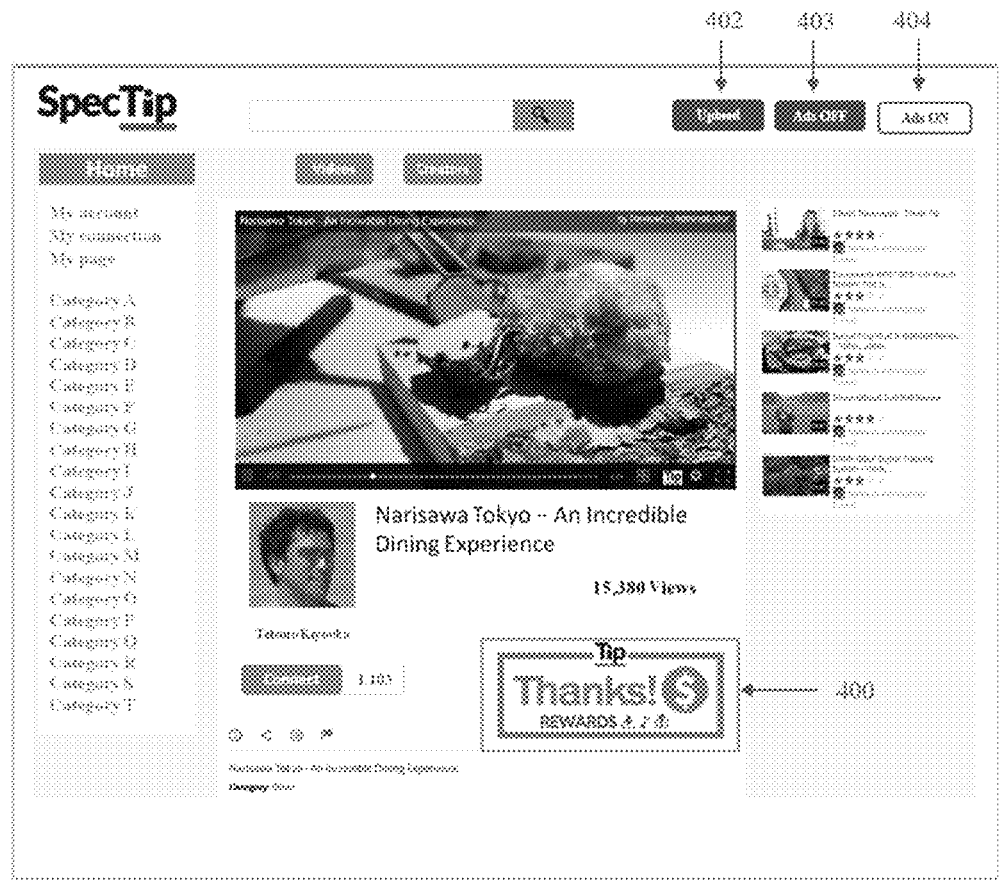
FIG. 23 is a schematic illustration of a video playback interface of the same.

When a viewer selects and designates a video for viewing (step 2201), the tipping button/link display module 200, detecting that a video has been designated, runs (step 2202), it is confirmed that a selection has been made to accept tips (Yes) in the tip acceptance option 901 made for the video provision options control module 126 in the user interface 900 (FIG. 26) for the video upload (step 2203, and an active tipping button 400 as shown in FIG. 23 is displayed as a result (step 2204), allowing the viewer to leave a tip.

Because other, conflicting remuneration payment means, such as the ad display module 125 in this example, are installed in the system of the present invention, the video provision options control module 126 stops the operation or inhibits the launching of the ad display module 125 so that no ads (of any sort, including in-stream ads) are displayed.

In the present embodiment, in other words, the video provision options control module 126 performs control so that either the tipping button/link display module 200 or the ad display module 125 operates, according to the setting (Yes or No) of the tip acceptance option 901.

When the ad display module 125 operates, an "Ads OFF" button 403 may be provided as shown, for example, beside the video "Upload" button 402 in FIG. 23, the video provision options control module 126 performs control so as to stop the operation of the ad display module 125, with the result that the video provision options control module 126 performs control so as to launch the tipping button/link display module 200. Such a button may also be set for the video hosting website 100 as a whole.

The system may also be configured so that, when the tipping button/link display module 200 is operating (the tipping button 400 is active), the video provision options control module 126 displays an "Ads ON" button 404, as shown in the drawing, and the button may be clicked to cause the video provision options control module 126 to stop the operation of the tipping button/link display module 200, the tipping button 400 is not displayed (rendered inactive), and the ad display module 125 is thereby launched, in the opposite of the process described above.

In this case, either the tip acceptance option 901 or the ad revenue option 905, but not both, as described above, is activated; the ad display module 125 launches; the ad revenue option 905 is set to Yes; the tip acceptance option 901, tip count display option 904, video download reward option 902, video audio download reward option 906, and extra reward option 907 are forcibly set to No and deactivated; and the video provision options control module 126 performs control so that the content creator cannot select or designate these options. As a result, when the operation of the ad display module 125 is stopped using the "Ads OFF" button 403 and the tipping button/link display module 200 exclusively operates, the tip acceptance setting 901 is forcibly set to Yes, the ad revenue option 905 is forcibly set to No, and the video provision options control module 126 performs control so that the content creator cannot select or designate these options.

As a result, the video hosting website becomes completely ad-free, including in-stream ads. In this case (ads not shown/ad revenue option 905 set to No), the content creator is capable of selecting and designating Yes or No for the video download reward option 902, video audio download reward option 906, and extra reward option 907 for tipping-enabled videos. The setting and operation of rewards will be described in detail hereinafter.

Next, when the viewer clicks on the tipping button 400 on the viewer terminal 141, the tip processing module 201 runs in response to the tip request (step 2205), the tip processing module 201 maps the video ID, user ID 160, tipping settings, tip payment settings, and tip amount settings (step 2206), and a tipping details confirmation screen 2501 is returned to the viewer terminal 141 (step 2207).

When the viewer has confirmed the tip details 2501 and clicks a confirm tipping button 2506 on the viewer terminal 141, the tip processing module 201 receives the confirmation signal (step 2208) and starts a tip payment approval process through the viewer terminal 141 (step 2209).

If the viewer's tip payment setting is set to credit card, electronic payment, or the like, the tip processing module 201 sends a payment approval request to the payment company, and obtains payment approval from the payment company (step 2210).

If the payment cannot be approved, a payment error message (not shown) is displayed on the viewer terminal 141.

When the tip payment has been approved, a tipping complete message is displayed on the viewer terminal 141 (step 2211), a tip ID is simultaneously issued (step 2212), and the information in the user database 131 and the video database 130 are updated and saved in association with the user ID 160 and the video ID (step 2213).

22. Controlling the Reward Settings User Interface

The control of the user interface provided on the content creator terminal 140 in the process described in section 4, "Uploading videos" will now be described.

Figure 26:
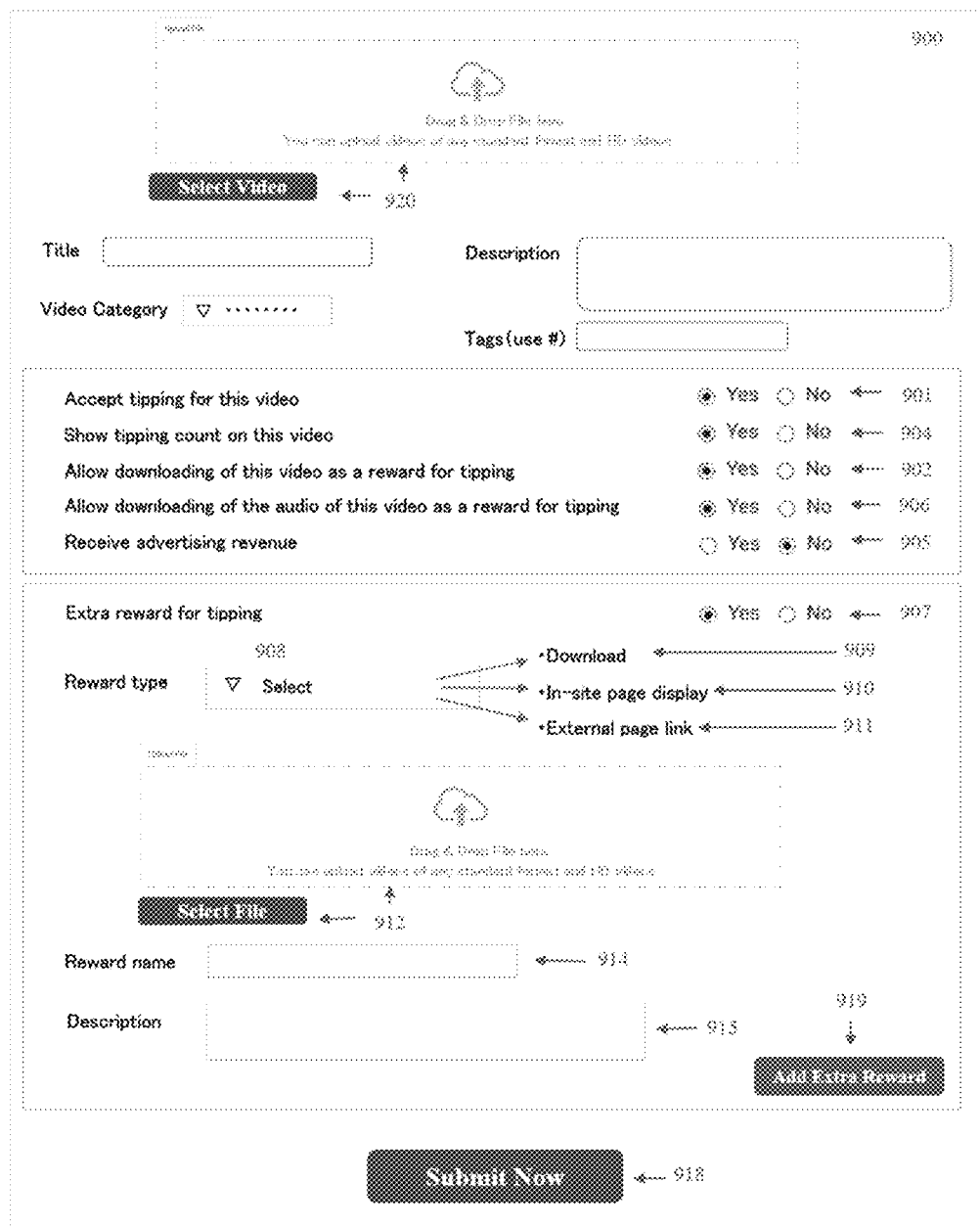
FIG. 26 is a schematic illustration of a video upload settings screen.

The present invention is provided with the aforementioned video provision options control module 126, which causes the tip acceptance option 901, tip count display option 904, video download reward option 902, video audio download reward option 906, and extra reward option 907 in the user interface 900 shown in FIG. 26 to work together.

Specifically, only if Yes has been designated for the tip acceptance option 901, the video provision options control module 126 displays an active tip count display option 904, video download reward option 902, video audio download reward option 906, and extra reward option 907, allowing these options to be selected and designated, and, if No has been designated for the tip acceptance option 901, the tip count display option 904, video download reward option 902, video audio download reward option 906, and extra reward option 907 are inactive, and cannot be selected and designated.

Specifically, because ad revenue is a means of receiving remuneration that conflicts with tip payments, the video provision options control module 126 sets the ad revenue option 905 to No if the content creator has selected Yes for the tip acceptance option 901, and makes it inactive so as not to be selectable.

As a result, no ads (of any sort, including in-stream ads) are displayed in the video. In other words, the video provision options control module 126 of the present invention is configured to run either the tip acceptance option 901 or the ad revenue option 905 depending on the setting (Yes or No) for the tip acceptance option 901.

As discussed above, the video provision options control module 126 is configured so that, only for videos for which the content creator has permitted tipping, the user, using the user interface 900, selects, designates, and sets whether to offer video downloading, video audio downloading, and extra rewards as rewards or to not offer video downloading, video audio downloading, and extra rewards.

Figure 24:
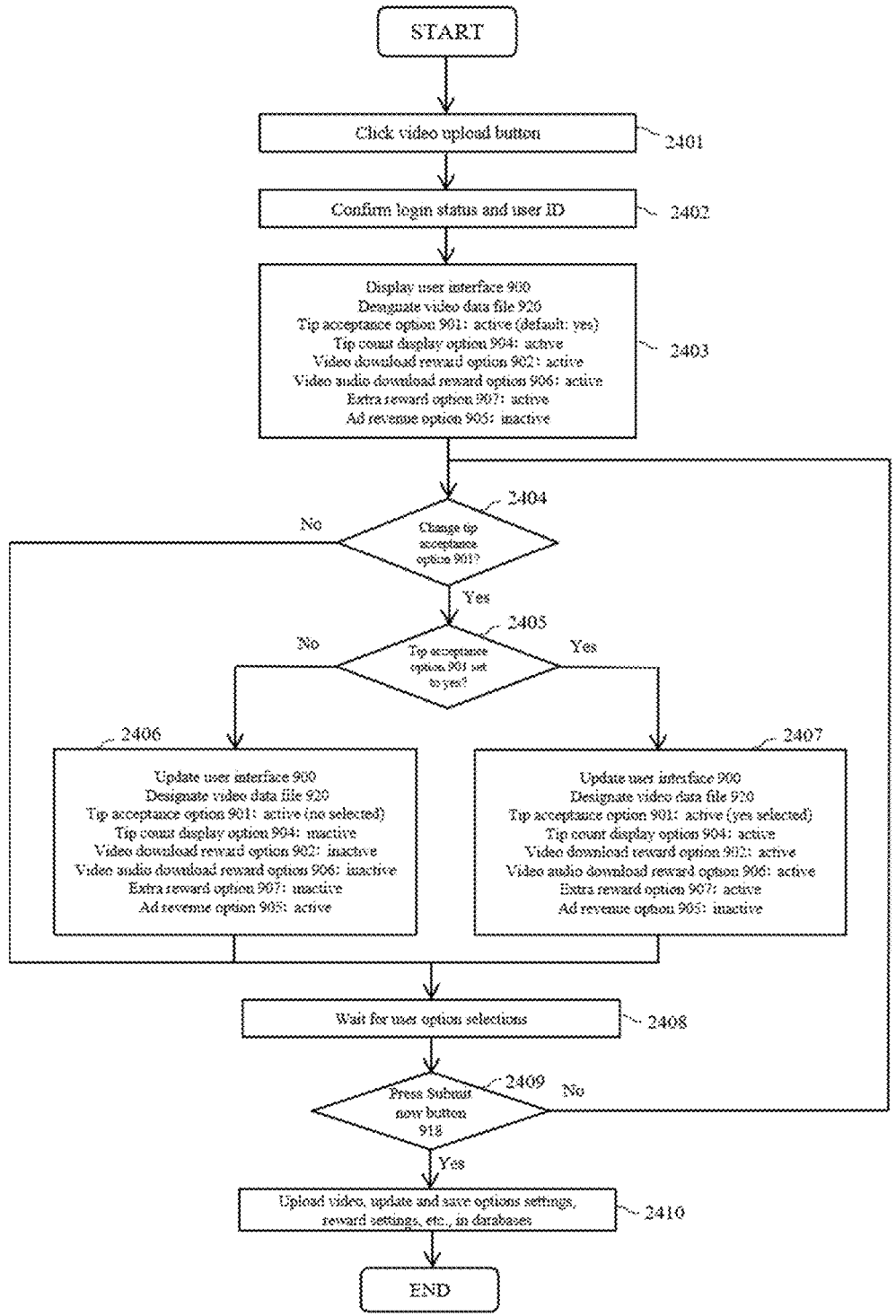
FIG. 24 is a flowchart of a video download process and a reward setting process.

Options settings associated with the video uploading described above, and the operation of the video provision options control module 126, described above will now be described in greater detail with reference to the flowchart in FIG. 24.

First, in step 2401, the content creator clicks, for example, the video "Upload" button 402 in the user interface shown in FIG. 23, whereupon the video provision options control module 126 confirms whether the content provider is already logged in (step 2402), has the content provider log in if not logged in, and displays a specific user interface 900 (FIG. 26) according to the ID 160 of the user (step 2403).

The user interface 900 is displayed (step 2403), and the video to be uploaded is designated in 920. Out of the multiple options 901, 902, 904, 905, 906, and 907 selectable by the content creator in the default display of the user interface 900, the video provision options control module 126 sets the tip acceptance option 901, tip count display option 904, video download reward option 902, video audio download reward option 906, and extra reward option 907 to active, and selects no for the ad revenue option 905 and sets the option to inactive so that it cannot be selected (step 2403).

In this embodiment, Yes is selected for all of the active options 901, 902, 904, 906, and 907. The ad revenue option 905 is forcibly set to No, and is in an inactive state.

Next, if the content creator changes the tip acceptance option 901 to No on the terminal 140, this is detected in steps 2404, 2405, and the display on the user interface 900 is updated (step 2406).

Specifically, in this case, the tip count display option 904, video download reward option 902, video audio download reward option 906, and extra reward option 907 are set to inactive, and the ad revenue option 905 is set to active in their place so that a selection can be made.

As described above, No is selected for the ad revenue option 905 by default.

If the content creator changes the tip acceptance option 901 to No, then back to Yes, this is detected in steps 2404, 2405, and the display on the user interface 900 is updated, as shown in step 2407.

Specifically, in this case, the tip acceptance option 901, tip count display option 904, video download reward option 902, video audio download reward option 906, and extra reward option 907 are set to active, and the ad revenue option 905 is set to No and rendered inactive and unselectable.

Next, the video provision options control module 126 waits for the user's option selections (step 2408), and, when the Submit Now button 918 is clicked (step 2409), the video importing module 121 uploads the video data designated in 920 described above and stores the data in the video database 130, and the records in the user database 131 are updated and saved (step 2410). Simultaneously, the video provision options control module 126 confirms the option settings selected by the content creator, runs the modules for the various options according to the options settings, the data and settings for the various options are saved in the various databases, and, simultaneously, the options settings are also saved in the user database 131, and the records are updated and saved (step 2410). The various options settings and the operation thereof will be described in detail hereinafter for each option.

In accordance with this arrangement, when Yes is set for the tip acceptance option 901, the video download reward option 902, video audio download reward option 906, and extra reward option 907 become active, making it possible to select the options to offer a video download reward, offer a video audio download reward, and offer an extra reward, or to not offer a video download reward, not offer a video audio download reward, and not offer an extra reward, for a tipping-enabled video (steps 2403, 2407).

23. Video Download Rewards

The present invention is provided with a video download reward function, allowing the content creator to select and designate Yes or No for the video download reward option 902 in the user interface 900 (FIG. 26). As described above, only when the content creator has set the tip acceptance option 901 to Yes, the video provision options control module 126 displays an active video download reward option 902, allowing a selection to be made and set, and the ad revenue option 905 is forcibly set to No and rendered inactive so that it cannot be selected.

If the tip acceptance option 901 is set to No, the video provision options control module 126 forcibly sets the video download reward option 902 to No and renders it inactive so that it cannot be selected, and the ad revenue option 905 is set to Yes.

The setting and operation of the video download reward option 902 will now be described in greater detail with reference to the flowchart in FIG. 24.

As described in the previous section, the content creator clicks on the video "Upload" button 402 (step 2401) and logs in, and the user ID 160 is identified (step 2402). When the content creator sets the video download reward option 902 to Yes (step 2407), the system waits for the content creator's option selections (step 2408), the Submit Now button 918 is pressed (step 2409), and the settings are saved (step 2410); the video provision options control module 126, which controls these options, runs, detects that the tip acceptance option 901 and the video download reward option 902 have been set to Yes, and conveys this information to the tipping button/link display module 200; and a tipping button 400 for the video is generated in the user interface (FIG. 25), and a reward indicator (REWARDS) 1007 and video download reward indicator 1002 are displayed on the tipping button 400.

This enables the viewer to confirm on the terminal 141, before giving a tip, that a video download reward is offered for the video.

Figure 25:
FIG. 25 is a schematic illustration of a video playback interface of the same.

When the video download reward option 902 is set to No, and this setting has been saved (step 2410), the video provision options control module 126 detects this fact and performs control so that the reward indicator (REWARDS) 1007 and video download reward indicator 1002 are not displayed on the tipping button 400 for the video in the user interface shown in FIG. 25, thus allowing a viewer to confirm that the video does not offer a video download reward.

24. Video Downloading/Saving

Figure 28:
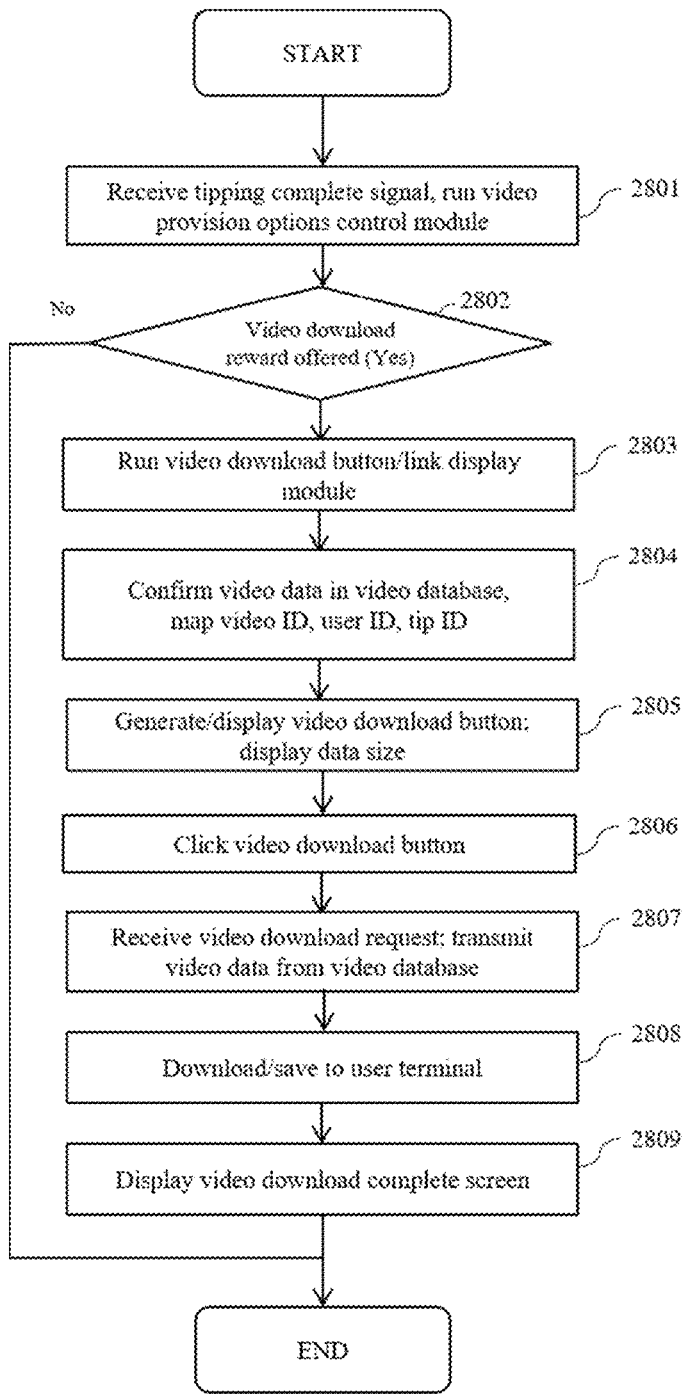
FIG. 28 is a flowchart of a reward download process of the same.

FIG. 28 is a flowchart of a process of downloading and saving a video download reward after a tip has been given.

When a viewer has finished giving a tip using the tipping button 400, in which the reward indicator (REWARDS)

Figure 27:
FIG. 27 is a schematic illustration of a video playback interface of the same.

1007 and video download reward indicator 1002 are displayed in FIG. 27, the video provision options control module 126 receives a tipping complete signal from the tip processing module 201 and runs (step 2801), and confirms the Yes settings for the tip acceptance option 901 and the video download reward option 902 options in 900 (FIG. 26) (step 2802).

If the video download reward option 902 is set to Yes, the video provision options control module 126 sends a request signal to the video download button/link display module 202 (step 2803), the video download button/link display module 202 confirms the video data in the video database 130, maps the video ID, user ID 160, and tipping ID (step 2804), generates a video download button 1001 (FIG. 27), displays the downloadable file size, and displays the video download button 1001 on a reward provision user interface 2701 (FIG. 27) (STEP 2805).

When the viewer clicks the video download button 1001 (step 2806), the video download button/link display module 202 receives a download request signal, extracts the indicated video file from the video database 130 and transmits the file to the viewer (step 2807), and the viewer saves the downloaded video on the terminal 141 (step 2808). When the video has finished downloading, a video download complete screen is displayed (step 2809).

In step 2802, if the video download reward option 902 has been set to No and the setting has been saved, a tipping button 400 for the video is generated and displayed on the user interface, the video provision options control module 126 detects that the tip acceptance option 901 has been set to Yes and the video download reward option 902 to No in the options settings in 900 and performs control, and the reward indicator (REWARDS) 1007 and video download reward indicator 1002 are not displayed on the tipping button 400 for the video, thus allowing the viewer to confirm that a video download reward is not offered for the video.

In this case, even if the viewer gives a tip using the tipping button 400 of the video, the video provision options control module 126, having received the tipping complete signal from the tip processing module 201, detects that the tip acceptance option 901 has been set to Yes and the video download reward option 902 to No and performs control (step 2802), the video download button/link display module 202 does not run, the video download button 1001 (FIG. 27) is not generated, and the video cannot be downloaded to and saved on the viewer's terminal 141.

After uploading a video, the content creator can log into the user account page (not shown) from the content creator terminal 140 and click a Manage Videos button (not shown) to access a user interface 1600, and access the user interface 900 for each video in 1601 to confirm and alter the settings for the tip acceptance option 901, tip count display option 904, video download reward option 902, video audio download reward option 906, ad revenue option 905, and extra reward option 907.

25. Video Audio Download Rewards

The present embodiment is provided with a video audio download reward function, allowing the content creator to select and designate Yes or No for the video audio download reward option 906 in the user interface 900 (FIG. 26). As described above, only when the content creator has set the tip acceptance option 901 to Yes, the video provision options control module 126 displays an active video audio download reward option 906, allowing a selection to be made and set, and the ad revenue option 905 is forcibly set to No and rendered inactive so that it cannot be selected.

If the tip acceptance option 901 is set to No, the video provision options control module 126 forcibly sets the video audio download reward option 906 to No and renders it inactive so that it cannot be selected, and the ad revenue option 905 is set to Yes.

The setting and operation of the video audio download reward option 906 will now be described in greater detail with reference to the flowchart in FIG. 24.

As described in the previous section, the content provider clicks on the video "Upload" button 402 (step 2401) on the content creator's terminal 140 and logs in, and the user ID 160 is identified (step 2402). When the content creator sets the video audio download reward option 906 to Yes (step 2407), the system waits for the content creator's option selections (step 2408), the Submit Now button 918 is pressed (step 2409), and the settings are saved (step 2410); the video provision options control module 126, which controls these options, runs, detects that the tip acceptance option 901 and the video audio download reward option 906 have been set to Yes, and conveys this information to the video audio module 206.

The video audio module 206 extracts the audio data from the video data stored in the video database 130; creates a file by converting (encoding, transcoding) and compressing the data to an optimal audio file format, such as MP3, FLAC, Vorbis, WAV, AAC, or the like; and assigns a video audio ID (identifier) to the file, maps the file with the video ID and the user ID 160, stores the file along with options settings in the video audio database 135, and updates and saves the user database 131.

The video audio module 206 then sends, to the video provision options control module 126, a signal indicating that the video audio has finishing being converted to a file, the video provision options control module 126 conveys this information to the tipping button/link display module 200, a tipping button 400 for the video is generated in the user interface (FIG. 25), and a reward indicator (REWARDS) 1007 and video audio download reward indicator 1005 are displayed on the tipping button 400.

This enables the viewer to confirm, before giving a tip, that a video audio download reward is offered for the video.

When the video audio download reward option 906 is set to No, and this setting has been saved (step 2410), the video provision options control module 126 detects this fact and performs control so that the reward indicator (REWARDS) 1007 and video audio download reward indicator 1005 are not displayed on the tipping button 400 for the video in the user interface shown in FIG. 25, thus allowing a viewer to confirm that the video does not offer a video audio download reward.

26. Video Audio Downloading/Saving

Figure 29:
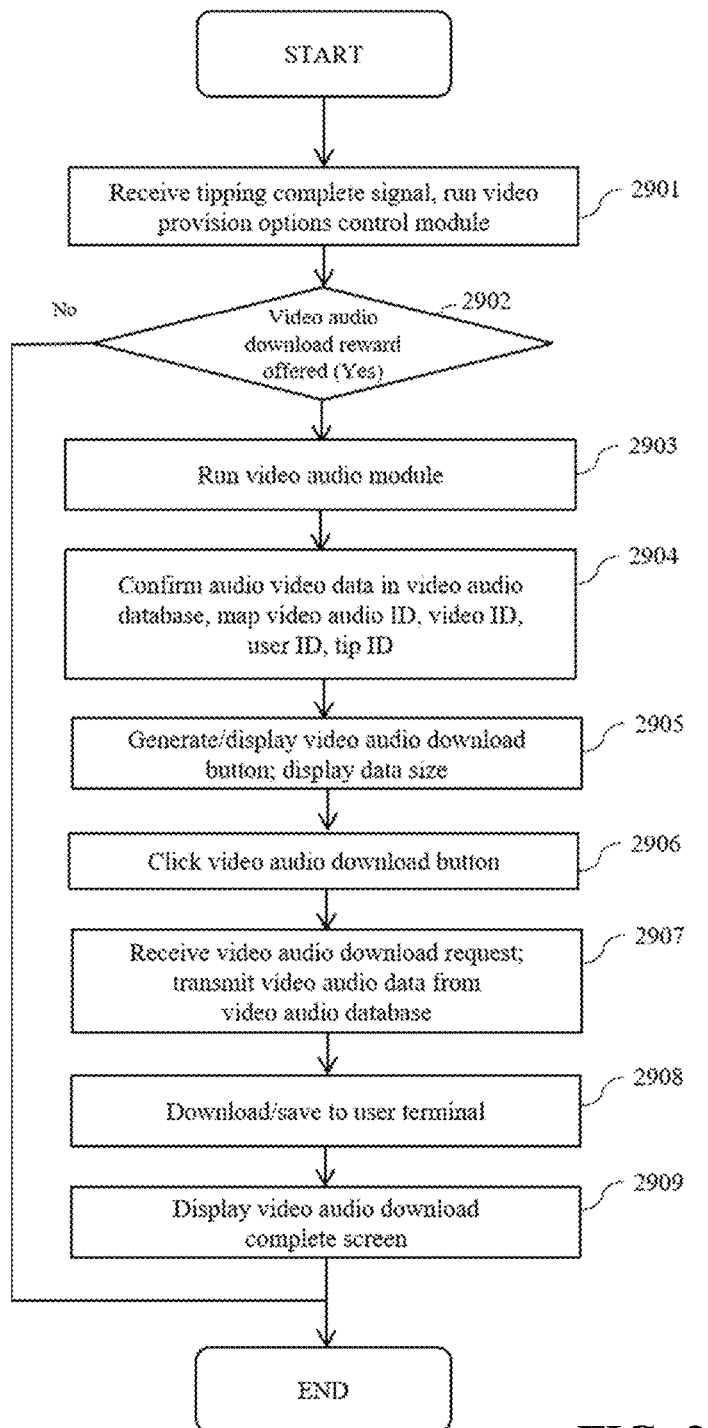
FIG. 29 is a flowchart of a reward download process of the same.

FIG. 29 is a flowchart of a process of downloading and saving a video audio download reward after a tip has been given.

When a viewer has finished giving a tip using the tipping button 400, in which the reward indicator (REWARDS) 1007 and video audio download reward indicator 1005 are displayed in FIG. 27, the video provision options control module 126 receives a tipping complete signal from the tip processing module 201 and runs (step 2901), and confirms the Yes settings for the tip acceptance option 901 and the video audio download reward option 906 options in 900 (FIG. 26) (step 2902).

If the video audio download reward option 906 is set to Yes, the video provision options control module 126 sends a request signal to the video audio module 206 (step 2903), the video audio module 206 confirms the video data in the video audio database 135, maps the video audio ID, video ID, user ID 160, and tipping ID (step 2904), generates a video audio download button 1008 (FIG. 27), displays the downloadable file size, and displays the video audio download button 1008 on the reward provision user interface 2701 (STEP 2905).

Then, when the viewer clicks the video audio download button 1008 (step 2906), the video audio module 206 extracts the indicated video audio file from the video audio database 135 and transmits the file to the viewer terminal 141 (step 2907), and the viewer downloads and saves the video audio for the video to the terminal 141 (step 2908).

When the video audio has finished downloading, a video audio download complete screen is displayed (step 2909).

In step 2902, if the video audio download reward option 906 has been set to No and the setting has been saved, a tipping button 400 for the video is generated and displayed in the user interface (FIG. 27), the video provision options control module 126 detects that the tip acceptance option 901 has been set to Yes and the video audio download reward option 906 to No in the options settings in 900 and performs control, and the reward indicator (REWARDS) 1007 and video audio download reward indicator 1005 are not displayed on the tipping button 400 for the video, thus allowing the viewer to confirm that a video audio download reward is not offered for the video.

In this case, even if the viewer gives a tip using the tipping button 400 of the video, the video provision options control module 126 detects that the tip acceptance option 901 has been set to Yes and the video audio download reward option 906 to No and performs control (step 2902), the video audio module 206 does not run, the video audio download button 1008 is not generated, and the video audio cannot be downloaded to and saved on the viewer's terminal 141.

After uploading a video from the terminal 140, the content creator can log into the user account page (not shown) from the content creator terminal 140 and click a Manage Videos button (not shown) to access a user interface 1600, and access the user interface 900 for each video in 1601 to confirm and alter the settings for the tip acceptance option 901, tip count display option 904, video download reward option 902, video audio download reward option 906, ad revenue option 905, and extra reward option 907.

27. Extra Rewards

The system according to the present embodiment is provided with an extra rewards function, and the content creator can select and designate Yes or No for the extra reward option 907 in the interface 900 (FIG. 26) displayed on the terminal 140.

As described above, only when the content creator has set the tip acceptance option 901 to Yes, the video provision options control module 126 displays an active extra reward option 907, allowing a selection to be made and set, and the ad revenue option 905 is forcibly set to No and rendered inactive so that it cannot be selected.

If the tip acceptance option 901 is set to No, the video provision options control module 126 forcibly sets the extra reward option 907 to No and renders it inactive so that it cannot be selected, and the ad revenue option 905 is set to Yes. The setting and operation of the extra reward option 907 will now be described in greater detail with reference to the flowchart in FIG. 24.

As described above, the content creator clicks on the video "Upload" button 402 (step 2401) and logs in, and the user ID 160 is identified (step 2402). If the content creator sets the extra reward option 907 to Yes, an active reward type selection 908 (FIG. 26) is displayed, and the content creator selects and designates the reward type.

If the content creator selects and designates a download reward type 909 or an in-site page display reward type 910 in the reward type selection 908, an active user interface 912 is displayed (FIG. 26), and the content creator designates the reward data in the user interface 912, and uploads the data from the terminal 140.

Digital content items of various formats, including video, audio, images, and text files such as MPEG, MP4, MOV, MP3, FLAC, WAV, JPEG, PNG, GIF, and PDF files, can be uploaded. The content creator enters a reward name in 914, and a reward description in 915.

If the content creator has designated an external page link reward type 911, an active URL input box 913 (FIG. 26A) is displayed, and the content creator enters the URL of an external page through which the reward is offered. The content creator enters a reward name in 914, and a reward description in 915. Also, when the external page link reward type 911 is selected, the user interface 912 is not displayed, making it impossible to designate and upload data.

The content creator sets the extra reward option 907 to Yes and designates one of a download reward type 909, an in-site page display type 910, or an external page line reward type 911 (step 2407), the system waits for the content provider's option selections (step 2408), the Submit Now button 918 is pressed (step 2409), and the settings are saved (step 2410); the video provision options control module 126, which controls these options, runs, detects that the tip acceptance option 901 and the extra reward option 907 have been set to Yes, and conveys this information to the extra reward module 207.

When a download reward type 909 is designated for the reward type selection 908, the extra reward module 207 creates a file by converting (encoding, transcoding) and compressing the extra reward data designated and uploaded using the user interface 912 to an optimal file format, and assigns an extra reward ID (identifier). The extra reward file and extra reward ID are mapped to the entered reward name 914, reward description 915, options settings, video ID, and user ID 160 and stored in the extra rewards database 136, and the user database 131 is updated and saved.

When an in-site page display reward type 910 is designated for the reward type selection 908, the extra reward module 207 creates a file by converting (encoding, transcoding) and compressing the extra reward data designated and uploaded using the user interface 912 to an optimal file format, assigns an extra reward ID (identifier) thereto, assigns an in-site page display URL for the video hosting website 100 at which the extra reward file is displayed, and generates an extra reward page on which the extra reward file is displayed. The extra reward file, extra reward page, in-site page display URL, and extra reward ID are mapped to the entered reward name 914, reward description 915, options settings, video ID, and user ID 160 and stored in the extra rewards database 136, and the user database 131 is updated and saved.

When an external page link reward type 911 is selected for the reward type selection 908, the extra reward module 207 assigns an extra reward ID (identifier) to the URL entered in the URL input box 913. The external page link and extra reward ID are mapped to the entered reward name 914, reward description 915, options settings, video ID, and user ID 160 and stored in the extra rewards database 136, and the user database 131 is updated and saved.

The extra reward module 207 then sends, to the video provision options control module 126, a signal indicating that the extra reward has finished processing, the video provision options control module 126 receives the signal and conveys this information to the tipping button/link display module 200, a tipping button 400 for the video is generated in the user interface (FIG. 25), and a reward indicator (REWARDS) 1007 and extra reward indicator 1006 are displayed on the tipping button 400, thereby allowing a viewer to confirm, before tipping, that the video comes with an extra reward.

When the extra reward option 907 is set to No, and this setting has been saved (step 2410), the video provision options control module 126 detects this fact and performs control so that the reward indicator (REWARDS) 1007 and extra reward indicator 1006 are not displayed on the tipping button 400 for the video in the user interface shown in FIG. 25, thus allowing a viewer to confirm that the video does not offer an extra reward.

Multiple extra rewards can be offered. To add an extra reward, an add extra reward button 919 is clicked to display an additional extra reward interface 921 on the user interface 900 (FIG. 26B), thus allowing Yes or No to be selected and designated for the extra reward option 907 as described above. The method of setting and the operation of additional extra rewards are the same as in the case of the method of setting extra rewards described above.

28. Receiving Extra Rewards

Figure 30:
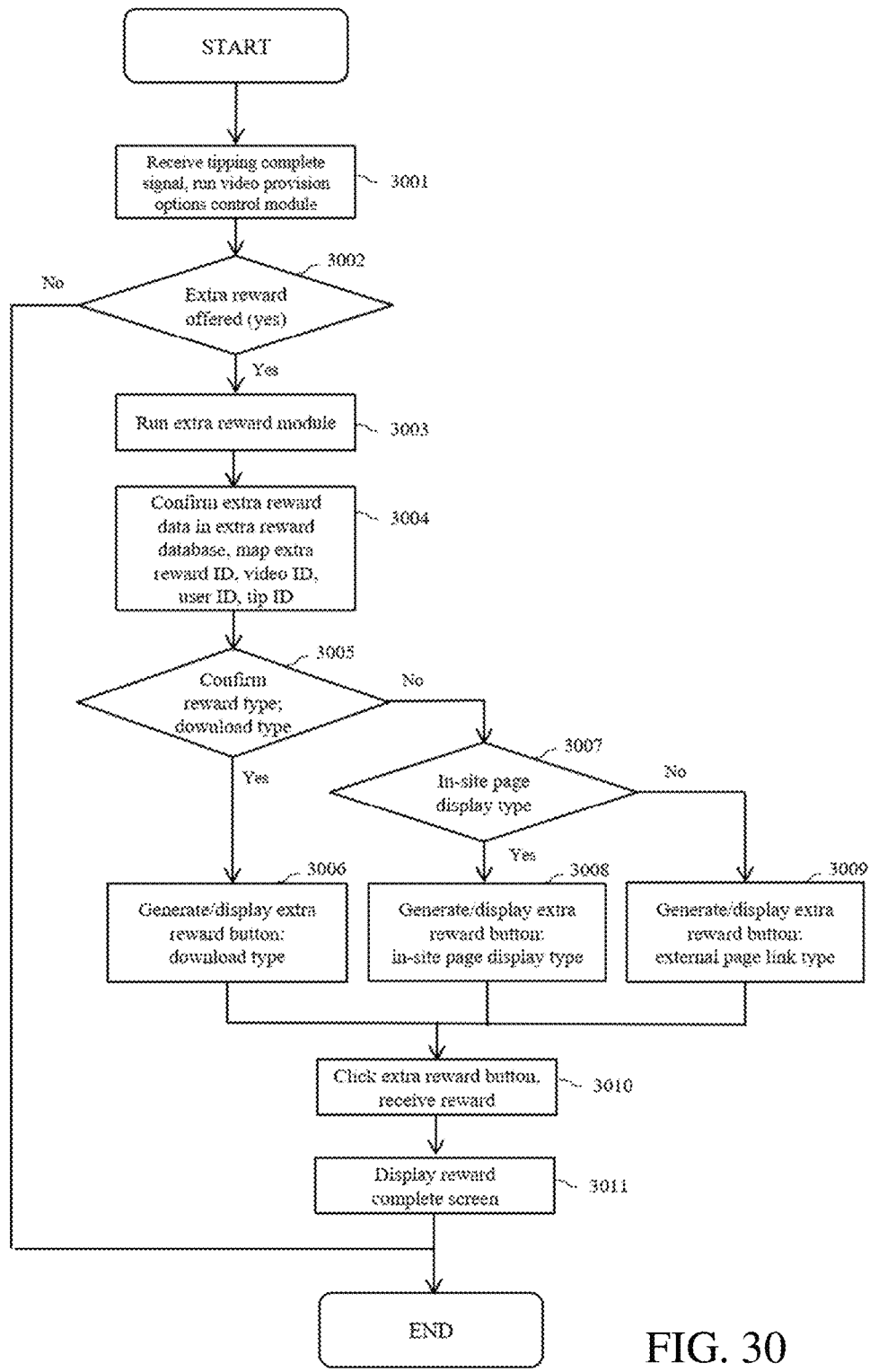
FIG. 30 is a flowchart of a reward offering process of the same.

FIG. 30 is a flowchart of a process of receiving an extra reward after a tip has been given.

When a viewer has finished giving a tip using the tipping button 400, in which the reward indicator (REWARDS) 1007 and extra reward indicator 1006 are displayed (FIG. 27), the video provision options control module 126 receives a tipping complete signal from the tip processing module 201 and runs (step 3001), and confirms the Yes settings for the tip acceptance option 901 and the extra reward option 907 options in 900 (FIG. 26, FIG. 26A and FIG. 26B) (step 3002), and sends a request to the extra reward module 207 (step 3003); and the extra reward module 207 confirms the extra reward data with the extra rewards database 136, maps the data to the extra reward ID, video ID, user ID 160, and tip ID (step 3004), and confirms the reward type designated in the reward type selection 908 (step 3005).

If the download reward type 909 is designated in the reward type selection 908 (step 3006), the extra reward module 207 generates an extra reward provision button 1004 (FIG. 27), and displays the extra reward provision button 1004 on the reward provision user interface 2701 along with the name of the extra reward, the form of the reward (in this case, a download), and the file size (step 3006).

When a viewer clicks the extra reward provision button 1004 (in this case, a download) (step 3010), the extra reward module 207 receives a request signal, extracts the indicated extra reward file from the extra rewards database 136, and transmits the file to the viewer terminal 141, and the viewer downloads and saves the extra reward on the terminal (step 3010). When the extra reward has finished downloading, an extra reward complete screen is displayed (step 3011).

If the in-site page display reward type 910 is designated in the reward type selection 908 (steps 3007, 3008), the extra reward module 207 embeds the assigned in-site page display URL in the extra reward provision button 1004A (FIG. 27), and displays the extra reward provision button 1004A on the reward provision user interface 2701 along with the name of the extra reward and the form of the reward (in this case, an in-site page display) (step 3008).

When the viewer clicks the extra reward provision button 1004A (step 3010), the assigned in-site page display URL page is linked to, the extra reward file is displayed on the in-site page (not shown), and the viewer receives the reward (step 3010). When the in-site extra reward page has finished displaying, an extra reward complete screen is displayed (step 3011).

If the external page link reward type 911 is designated in the reward type selection 908 (step 3009), the extra reward module 207 embeds the URL entered into the external page link URL input box 913 in the extra reward provision button 1004B (FIG. 27), and displays the extra reward provision button 1004B on the reward provision user interface 2701 along with the name of the extra reward and the form of the reward (in this case, an external page link) (step 3009).

When the viewer clicks the extra reward provision button 1004B (step 3010), an external page indicated by the URL entered into the URL input box 913 is linked to, the page is displayed, and the viewer who gave the tip receives the reward on the displayed external page (not shown). When the extra reward external page has finished displaying, an extra reward complete screen is displayed (step 3011).

In step 3002, if the extra reward option 907 has been set to No and the setting has been saved (step 3002), a tipping button 400 for the video is generated on the user interface in FIG. 27, the video provision options control module 126 detects that the extra reward option 907 for the video has been set to No and performs control, and the reward indicator (REWARDS) 1007 and extra reward indicator 1006 are not displayed on the tipping button 400, thus allowing the viewer to confirm that an extra reward is not offered for the video.

In this case, even if the viewer gives a tip for the video using the tipping button 400, the video provision options control module 126 detects that the extra reward option 907 has been set to No and performs control, the extra reward module 207 does not run, and extra reward provision buttons 1004, 1004A and 1004B are not generated, making it impossible to receive extra rewards for the video.

After uploading a video from the terminal 140, the content creator can log into the user account page (not shown) from the content creator terminal 140 and click a Manage Videos button (not shown) to access a user interface 1600, and access the user interface 900 for each video in 1601 to confirm and alter the settings for the tip acceptance option 901, tip count display option 904, video download reward option 902, video audio download reward option 906, ad revenue option 905, and extra reward option 907.

29. Tipping Button and Tipping Details Confirmation Screen

While the main function of the tipping button 400 in the present invention is as a tipping button while a viewer is watching a video, the reward indicator (REWARDS) 1007, video download reward indicator 1002, video audio download reward indicator 1005, and extra reward indicator 1006 are displayed on the tipping button 400 according to the options settings selected by the content creator, as discussed above, allowing the viewer to confirm an overview of rewards before tipping.

Figure 26A:
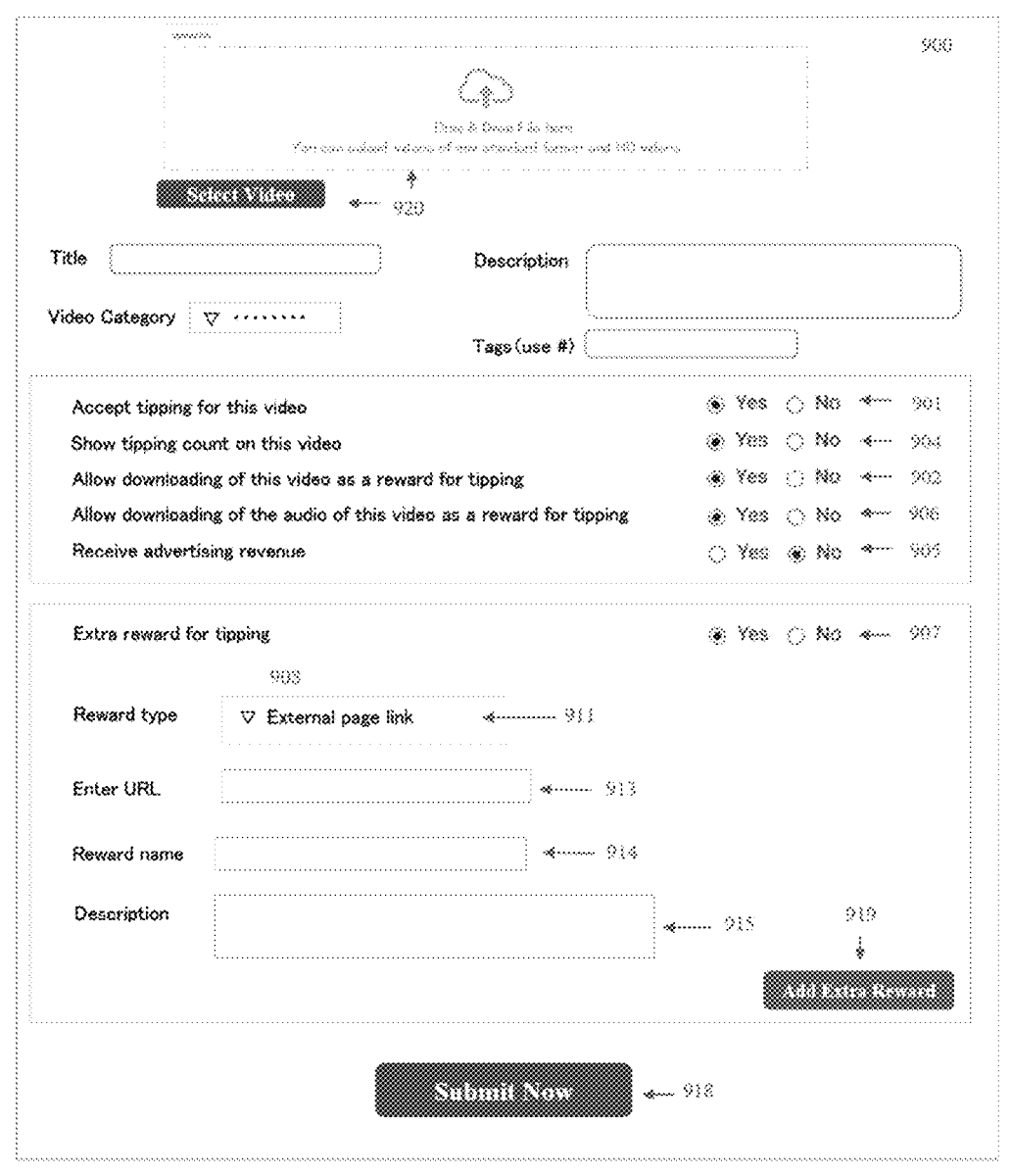
Figure 26B:
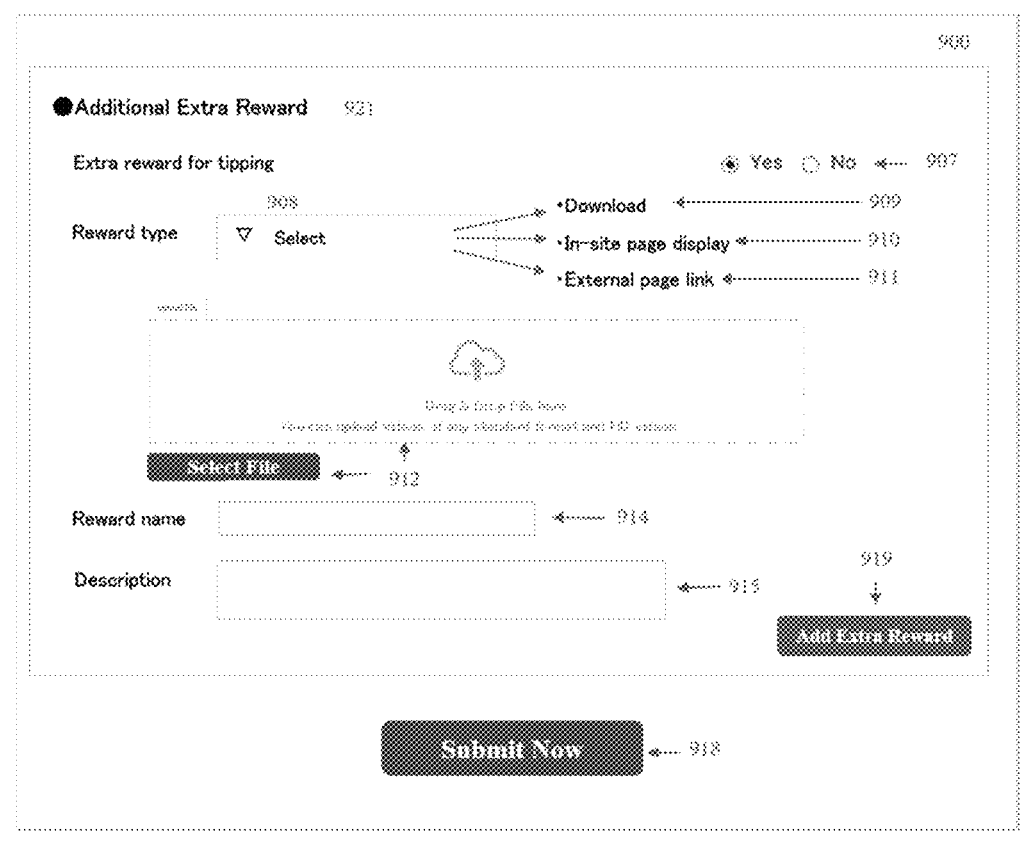

When a viewer clicks on the tipping button 400 while any of the reward indicator (REWARDS) 1007, video download reward indicator 1002, video audio download reward indicator 1005, and extra reward indicator 1006 is displayed on the tipping button 400, and the tipping details confirmation screen 2501 is displayed; and the reward indicator (Rewards for tipping) 2502, video download reward details (file size indication) 2503, video audio download reward details (file size indication) 2504, and extra rewards details (extra reward names and reward types) 2505 are displayed on the tipping details confirmation screen 2501 according to the options settings in the user interface 900 (FIG. 26, FIG. 26A and FIG. 26B). This function allows the viewer to confirm the details of the rewards before tipping.

30. Simultaneous Designation of Tip Remuneration Means and Ad Remuneration Means In the embodiment described in the previous sections, the video provision options control module 126 activates either the tip acceptance option 901 or the ad income acceptance option 905, but not both, and activates either the accompanying tipping button/link display module 200 or the ad display module 125, but not both, thus forcing a mutually exclusive choice of tips or ads as the remuneration payment means.

However, it is also possible to change the settings of the video provision options control module 126, simultaneously activate both the tip acceptance option 901 and the ad income acceptance option 905, and simultaneously activate the accompanying tipping button/link display module 200 and ad display module 125 to allow the tip acceptance option 901 and the ad income acceptance option 905 to be simultaneously set to Yes, and control the video provision options control module 126 so as to simultaneously receive tip remuneration and ad remuneration.

In this case, the mutually exclusive operation of the tip acceptance option 901 and the ad revenue option 905, and the mutually exclusive operation of the accompanying tipping button/link display module 200 and ad display module 125, are eliminated.

As a result, the tip acceptance option 901 and ad income acceptance option 905 can be simultaneously set to Yes. In this case as well, however, the video provision options control module 126 displays an active tip count display option 904, video download reward option 902, video audio download reward option 906, and extra reward option 907, enabling selection and designation thereof, only when the tip acceptance option 901 has been set to Yes, as in the previous sections.

In this case as well, the tip count display option 904, video download reward option 902, video audio download reward option 906, and extra reward option 907 are forcibly set to No and become inactive, making it impossible to select and designate these options, when the tip acceptance option 901 has been set to No, as in the previous sections.

31. Operator Default Settings

The operator of the video hosting website 100 can preset default settings for the user interface 600, in which the tipping button 400 is set, and the user interface 900, in which rewards for tips are set.

For example, it is generally unrealistic to assume that a tip of less than USD 1.00 will be given in the United States, where tipping is and established custom—in other words, the act of giving a tip less than USD 1.00 may be equivalent to an insult.

Therefore, the operator of the video hosting website 100 can preset a default tip amount setting of "USD 1.00" per click of the tipping button 400 in the user interface 600 in which the tipping button 400 is set.

The viewer can also check and alter the settings for the tipping button 400 at any time by logging into the user account page (not shown) and using the tipping settings button (not shown) to access the user interface 600 and confirm and alter the default settings for the tipping button 400.

Similarly, the operator of the video hosting website 100 can set default settings for the user interface 900, in which rewards for tips are set.

The reason for this is that it is possible, in view of the characteristics of the present invention, for tip revenue to be the main revenue stream of the content creator, and a plurality of rewards (premiums) out of a video download reward, a video audio download reward, and an extra reward can be offered so that the viewer can clearly understand that these services are rewards (premiums) for tips given when viewing videos, while simultaneously increasing, through the plurality of rewards (premiums), the viewer's incentive to tip, which also leads to increased tip revenue for the content creator.

Thus, the operator of the website 100 can also, for example, set the tip acceptance option 901, video download reward option 902, and video audio download reward option 906 to Yes as default settings. As discussed above, the content creator can also click the video "Upload" button 402 to access the user interface 900 and confirm and change the default reward settings.

While the foregoing, in order to make the invention clearer, includes explicit disclosures of services only for content creators and viewers, services can be offered to all users possessing a user ID 160.

While the video hosting website 100 in the present invention is a video sharing site, some of the functions (tipping and rewards) of the present invention can also be applied to other online services such as image sharing sites, SNSs, and blogs.

The present invention is not limited to the embodiment described above, and various modifications may be made thereto to the extent that they do not depart from the gist of the invention.

The invention claimed is:

1. A computer program product for implementing a video streaming playback system, the computer program product comprising a non-transitory computer-readable storage medium embodying computer-executable program instructions thereon that, when executed by a processor, cause one or more computers to execute:

a video playback module, configured to provide a video that was previously uploaded to a specific video hosting site by a user who is a content creator on a user interface displayed on a computer of a content consumer so as to enable streaming playback of the video over an electronic network, the video playback module having a video playback operation to allow the video to be played on the user interface;

a tipping module configured to operate in tandem with the video playback operation performed by the video playback module, the tipping module configured to perform a tipping process;

a reward download button/link display module configured to operate in tandem with the tipping process performed by the tipping module;

a setup interface configured for the user who is a content creator to select to offer a reward or not offer a reward for the video which the user who is a content creator has uploaded upon payment of a tip;

wherein the tipping module comprises:

a tipping button/link display module configured to display an activated tipping button/link on the user interface; and a tip processing module configured to, in response to the content consumer operating the activated tipping button/link, process payment of a tip of a specific amount according to a default setting or a setting made by the user who is a content creator;

wherein the reward download button/link display module is configured to, in response to a tip payment process being executed for the video, display an activated reward download button/link on the user interface when the user who is a content creator has selected using the setup interface to offer a reward upon payment of a tip, or has not selected using the setup interface to not offer a reward upon payment of a tip, and not display an activated reward download button/link on the user interface when the user who is a content creator has not selected using the setup interface to offer a reward upon payment of a tip, or has selected using the setup interface to not offer a reward upon payment of a tip.

2. The computer program product according to claim 1, wherein the system allows downloading of a video file to the computer of the content consumer by operating the activated reward download button/link displayed on the user interface.

3. The computer program product according to claim 1, wherein the computer-executable program instructions further cause the one or more computers to execute:

an ad module configured to operate in tandem with the video playback operation performed by the video playback module; and a video provision options control module for allowing the user who is a content creator to select options pertaining to the operation of the tipping module, the reward download button/link display module, and the ad module;

wherein the video provision options control module provides a setup interface configured to display, to the user who is a content creator, options of:

(1) whether to accept tips by operating the tipping module, (2) whether to permit to offer a reward by operating the reward download button/link display module, and (3) whether to display ads by operating the ad module; and wherein the video provision options control module enables a selection at option (2) and prohibits a selection at option (3) and the operation of the ad module when a selection of accepting tips has been made at option (1); and prohibits the operation of the tipping module and the reward download button/link display module, and enables a selection at option (3) when a selection of not accepting tips has been made at option (1); and wherein the ad module displays, in tandem with the video playback operation performed by the video playback module, a specific ad on the user interface before and/or during the video playback when the option (3) is selected.

4. The computer program product according to claim 3, wherein:

the tipping module further comprises a video rating generation module configured to, in response to the tipping process being executed for the video, generate a rating for the video, associate the rating with the video, and store the rating so as to be displayable to all content consumers on the user interface; and the video provision options control module displays a video rating generated by the video rating generation module on the user interface when a selection to accept tips has been made in the setup interface.

5. The computer program product according to claim 4, wherein:

the video rating generation module calculates a tipping frequency (payment count÷view count), and generates the video rating on the basis of the tipping frequency.

6. The computer program product according to claim 4, wherein:

the video rating is displayed on the user interface so as to be displayable to all content consumers in the form of a number (numerical value) or stars (number of stars).

7. A video streaming playback method that uses a video streaming playback system including (i) a video playback module for providing a video that was previously uploaded to a specific video hosting site by a user who is a content creator on a user interface displayed on a computer of a content consumer so as to enable streaming playback of the video over an electronic network, the video playback module having a video playback operation to allow the video to be played on the user interface; (ii) a tipping module that operates in tandem with the video playback operation performed by the video playback module, the tipping module configured to perform a tipping process; and (iii) a reward download button/link display module configured to operate in tandem with the tipping process performed by the tipping module;

the video streaming playback method comprising:

a step, executed by the video streaming playback system, of providing a setup interface configured for the user who is a content creator to select to offer a reward or not offer a reward for the video which the user who is a content creator has uploaded upon payment of a tip;

steps, executed by the tipping module, of displaying an activated tipping button/link on the user interface; and in response to the content consumer operating the activated tipping button/link, processing payment of a tip of a specific amount according to a default setting or a setting made by the user who is a content creator; and a step, executed by the reward download button/link display module, of:

in response to a tip payment process being executed for the video, displaying an activated reward download button/link on the user interface when the user who is a content creator has selected using the setup interface to offer a reward upon payment of a tip, or has not selected using the setup interface to not offer a reward upon payment of a tip;

wherein an activated reward download button/link is not displayed on the user interface when the user who is a content creator has not selected using the setup interface to offer a reward upon payment of a tip, or has selected using the setup interface to not offer a reward upon payment of a tip.

8. The method according to claim 7, wherein the video streaming playback system further comprises (iv) an ad module configured to operate in tandem with the video playback operation performed by the video playback module; and (v) a video provision options control module configured to enable the user who is a content creator to select options pertaining to the operation of the tipping module, the reward download button/link display module, and the ad module;

the video streaming playback method further comprising:

steps, executed by the video provision options control module, of providing a setup interface to display options of:

(1) whether to accept tips by operating the tipping module, (2) whether to permit to offer a reward by operating the reward download button/link display module, and (3) whether to display ads by operating the ad module; and enabling a selection at option (2) and prohibiting a selection at option (3) and the operation of the ad module when a selection of accepting tips has been made at option (1); and prohibiting the operation of the tipping module and the reward download button/link display module and enabling a selection at option (3) when a selection of not accepting tips has been made at option (1); and a step, executed by the ad module, of displaying, in tandem with the video playback operation performed by the video playback module, a specific ad on the user interface before and/or during the video playback when the option (3) is selected.

9. The method according to claim 8, wherein:

the tipping module comprises a video rating generation module in which, in response to the tipping process being executed for the video, a rating is generated for the video, associated with the video, and stored so as to be displayable to all content consumers on the user interface; and the video provision options control module comprises a step of displaying a video rating generated by the video rating generation module on the user interface when a selection to accept tips has been made as a selection on the setup interface.

10. The method according to claim 9, wherein:

the video rating generation module comprises a step of calculating a tipping frequency (payment count÷view count), and generating the video rating on the basis of the tipping frequency.

11. The method according to claim 9, wherein:

the video rating is displayed on the user interface so as to be displayable to all content consumers in the form of a number (numerical value) or stars (number of stars).

\* \* \* \* \*